(12) United States Patent
Diaz et al.

(10) Patent No.: US 6,407,910 B1
(45) Date of Patent: Jun. 18, 2002

(54) COMPUTER WITH MODULAR DRIVE IN SEPARATE BAY

(75) Inventors: Elizabeth Brandon Swan Diaz, Woodside; Felix Guerra, San Jose; Yancy Chen, Campbell, all of CA (US); Kun-Chi Hsieh; Bo Siu-Fai, both of Taipei (TW)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/552,193

(22) Filed: Apr. 19, 2000

(51) Int. Cl.$^7$ .................................................. H05K 5/00
(52) U.S. Cl. ...................... 361/683; 361/681; 361/682; 312/223.1; 395/280
(58) Field of Search ........................ 361/680, 682–685, 361/687, 679, 724–727, 741–742, 756, 758, 784, 790, 796, 801, 816; 364/708.1; 312/223.1, 223.2, 298, 223.3; 395/280, 281, 282, 284; 358/474, 496, 401–404, 497–498; 29/830–832

(56) References Cited

U.S. PATENT DOCUMENTS

| | | | | | |
|---|---|---|---|---|---|
| 5,051,868 | A | * | 9/1991 | Leverault et al. ............ | 361/395 |
| 5,172,305 | A | * | 12/1992 | DeWilde ..................... | 361/415 |
| 5,271,152 | A | * | 12/1993 | Murthy ........................ | 29/830 |
| 5,349,132 | A | * | 9/1994 | Miller et al. ............... | 174/35 R |
| 5,593,220 | A | | 1/1997 | Seid et al. ................... | 312/265 |
| 5,701,231 | A | * | 12/1997 | Do et al. ..................... | 361/683 |
| 5,790,278 | A | * | 8/1998 | Ehrne et al. ................. | 358/496 |
| 5,808,864 | A | * | 9/1998 | Jung ............................ | 361/685 |
| 5,825,626 | A | | 10/1998 | Hulick et al. ............... | 361/724 |
| 5,831,822 | A | | 11/1998 | Hulick et al. ............... | 361/687 |
| 5,877,938 | A | * | 3/1999 | Hobbs et al. ............... | 361/724 |
| 6,052,276 | A | * | 4/2000 | Do et al. ..................... | 361/684 |
| 6,137,678 | A | * | 10/2000 | Gebara et al. .............. | 361/685 |

FOREIGN PATENT DOCUMENTS

JP 02000194448 A * 7/2000 ............. G06F/1/16

OTHER PUBLICATIONS

U.S. Patent application Ser. No. 09/552,201 filed the same date as this application for Computer with Modular Components of Elizabeth B. Diaz, Felix Guerra, and Yancy Chen (Attorney Docket No. 10002252–1).
U.S. Patent application Ser. No. 09/552,556 filed the same date as this application for Computer with Modular Power Supply Assembly in Separate Bay of Elizabeth B. Diaz, Felix Guerra, Yancy Chen, Kun–Chi Hsieh and Bo Siu–Fai (Attorney Docket No. 10002255–1).
U.S. Patent application Ser. No. 09/552,193 filed the same date as this application for Computer with Modular Removeable Media Drive of Elizabeth B. Diaz, Kun–Chi Hsieh and Bo Siu–Fai (Attorney Dcoket No. 10002256–1).
Macworld Magazine, Jun. 1999, p. 148—Apple Power Macintosh G3 Series.
Macworld Magazine, May 2000, p. 129—Power Mac G4.
U.S. Patent application No. 09/552,555 filed same date as this application for Computer with Readily Accessible Motherboard of Elizabeth B. Diaz, Kun–Chi, Hsieh and Bo Siu–Fai (Attorney Docket No. 10002253–1).

* cited by examiner

Primary Examiner—Leo P. Picard
Assistant Examiner—Michael Datskovsky
(74) Attorney, Agent, or Firm—David Mason

(57) ABSTRACT

A tower computer with a sheet metal housing which has a plurality of separate bays housing a plurality of computer components including a bay located at one vertical end of the sheet metal housing with a media drive assembly readily-removeably mounted therein exclusive of any other ones of the plurality of computer components.

17 Claims, 23 Drawing Sheets

COMPUTER WITH MODULAR DRIVE IN SEPARATE BAY

FIELD OF THE INVENTION

The invention relates generally to computers and, more particularly, to a computer in a tower configuration provided with a modular data storage media drive located in a separate drive bay.

RELATED APPLICATIONS

The present application is related to the following U.S. patent applications which were filed on the same date as this application: U.S. patent application Ser. No. 09/552,201, for COMPUTER WITH MODULAR COMPONENTS of Elizabeth B. Diaz, Felix Guerra, and Yancy Chen; U.S. patent application Ser. No. 09/552,555, for COMPUTER WITH READILY ACCESSIBLE MOTHERBOARD of Elizabeth B. Diaz, Kun-Chi Hsieh, and Bo Sui-Fai, U.S. patent application Ser. No. 09/552,556, for COMPUTER WITH MODULAR POWER SUPPLY ASSEMBLY IN SEPARATE BAY of Elizabeth B. Diaz, Felix Guerra, Yancy Chen, Kun-Chi Hsieh, and Bo Siu-Fai and U.S. patent application Ser. No. 09/552,193 for COMPUTER WITH MODULAR REMOVEABLE MEDIA DRIVE of Elizabeth B. Diaz, Kun-Chi Hsieh, and Bo Siu-Fai which are hereby incorporated by reference for all that is disclosed therein.

BACKGROUND OF THE INVENTION

There has been a continuing trend since personal computers were introduced about twenty years ago to reduce the size of the computer housing or "box" that holds the basic computer components such as the motherboard, power supply and various drives. One of the reasons for this trend is that computer peripherals have become increasingly available and affordable and thus compete for desk top space with computers. For example it is not uncommon for a modern computer user to have a computer, mouse, keyboard, 21 inch monitor, personal printer and scanner on his/her desk top whereas twenty years ago a typical desk top would have had nothing on it other than a typewriter or calculator.

One technique now widely employed by designers for reducing a computer's desk top "footprint" is use of a "tower" configuration. Whereas a standard computer housing has a relatively small height and relatively larger length and width dimensions, a tower computer has a relatively small width and relatively larger length and height dimensions.

However there are certain considerations which are a challenge to a designer's ability to down size a computer, whether in a standard or tower configuration. To begin with there are certain features which all modern computer users expect to be provided in a desk top personal computer. A motherboard and power supply assembly are of course required to make the computer functional. Program and data storage devices of some type are also required. Presently the storage devices typically installed are a fixed media drive, typically a hard disk, and a removable media drive. The removable media drive which is most commonly installed is an optical drive such as a CD or DVD drive. Thus the computer housing must have a space for each of these components.

One design technique for installing computer components in a small space is to increase component density, i.e. to pack the components tightly together within the housing. However a competing consideration is the need to provide adequate cooling of a modern computer's more powerful CPU (central processing unit) and high speed drives. If components are too tightly packed, cooling becomes problematic. Another consideration which cuts against dense packing is the desire of computer owners to be able to upgrade their computers by addition of RAM (random access memory) chips and expansion cards to the motherboard. A still further consideration is a desire by computer owners as well as computer manufacturers who must perform warranty repair work, for a computer configuration which provides easy access to various components which may require maintenance or replacement during the life of the computer. In densely packed housings it is often necessary to go through the tedious process of removing one or more components using special tools and techniques in order to gain access to the component which must be tested or replaced.

Thus a need exists for a computer which is relatively compact and yet which has adequate space for cooling and which is relatively easy to upgrade and maintain/repair.

SUMMARY OF THE INVENTION

The present invention is directed to a computer having a modular media drive. The drive may be a hard drive. The modular hard drive may be mounted in a separate bay provided at an end portion of a sheet metal housing. The bay is constructed and arranged to enable the drive to be quickly and easily removed for maintenance and/or replacement. Placing the drive in a separate bay also facilitates access to other computer components since access to them is not blocked by the drive. In one embodiment the drive is accessed through opening a pivotal door which forms a part of the computer housing bottom wall. The door may be provided with ventilation holes. The drive may be removeably mounted on the door.

Thus the invention may comprise a tower computer including a sheet metal housing having a plurality of separate bays housing a plurality of computer components. The separate bays include a bay located at one vertical end of the sheet metal housing. A media drive assembly is readily-removeably mounted in the end bay exclusive of any other ones of the plurality of computer components.

The invention may also comprise a method of making a tower computer including: providing a housing with an enclosure at one end; pivotally mounting an end panel at the one end in pivotally coverable and uncoverable relationship with the enclosure; readily-removeably-mounting a first media drive in the enclosure; and mounting a computer motherboard assembly, a computer power supply and all media drives other than the first media drive in a portion of the housing outside the enclosure.

The invention may also comprise a method of removing a media drive from a tower computer having a plurality of computer functional components contained within a housing including: opening an access door to a computer housing enclosure which encloses, out of the plurality of computer functional components, only a media drive; and disconnecting electrical cables from said media drive.

BRIEF DESCRIPTION OF THE DRAWING

One illustrative and presently preferred embodiment of the invention is illustrated in the appended drawing of which.

DETAILED DESCRIPTION OF THE INVENTION

In General

Figure 1:
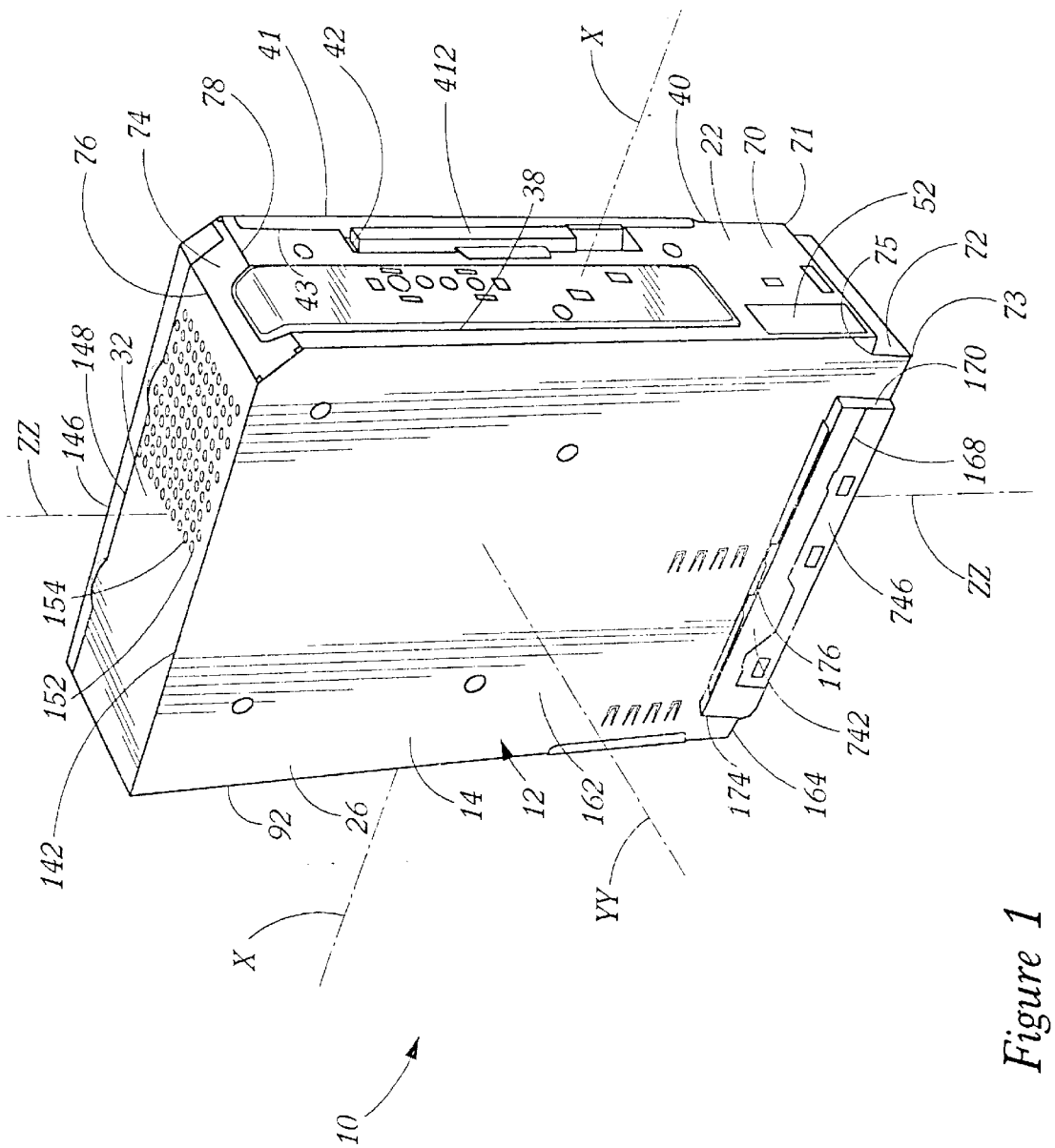
FIG. 1 is a top, front, left perspective view of a computer housing.

The drawing FIGS. 1–23, in general, illustrate a tower computer 10 with a sheet metal housing 12. The housing 12 has a plurality of separate bays 300, 570, 740 housing a plurality of computer components. The separate bays include a bay 740 located at one vertical end of the sheet metal housing 12. A media drive assembly 710 is readily-removeably mounted in the end bay 740 exclusive of any other ones of the plurality of computer components.

The Housing Exterior Portions

Having thus described a computer housing 12 generally, the housing and computer components mounted therein will now be described in further detail. FIGS. 1–5 illustrate a tower computer 10 comprising a sheet metal housing 12 having an outside surface 14 and an inside surface 16. The housing has central and intersecting longitudinal, lateral, and vertical axes XX, YY, and ZZ respectively. (All reference to "horizontal" and "vertical" herein assume the normal operating position of the computer or the subject component unless otherwise noted.) The sheet metal may be steel and may have a wall thickness of, e.g. 0.6 mm to 0.8 mm. Those having skill in the art will understand that other wall thickness dimensions and other types of metal may also be used.

Figure 4:
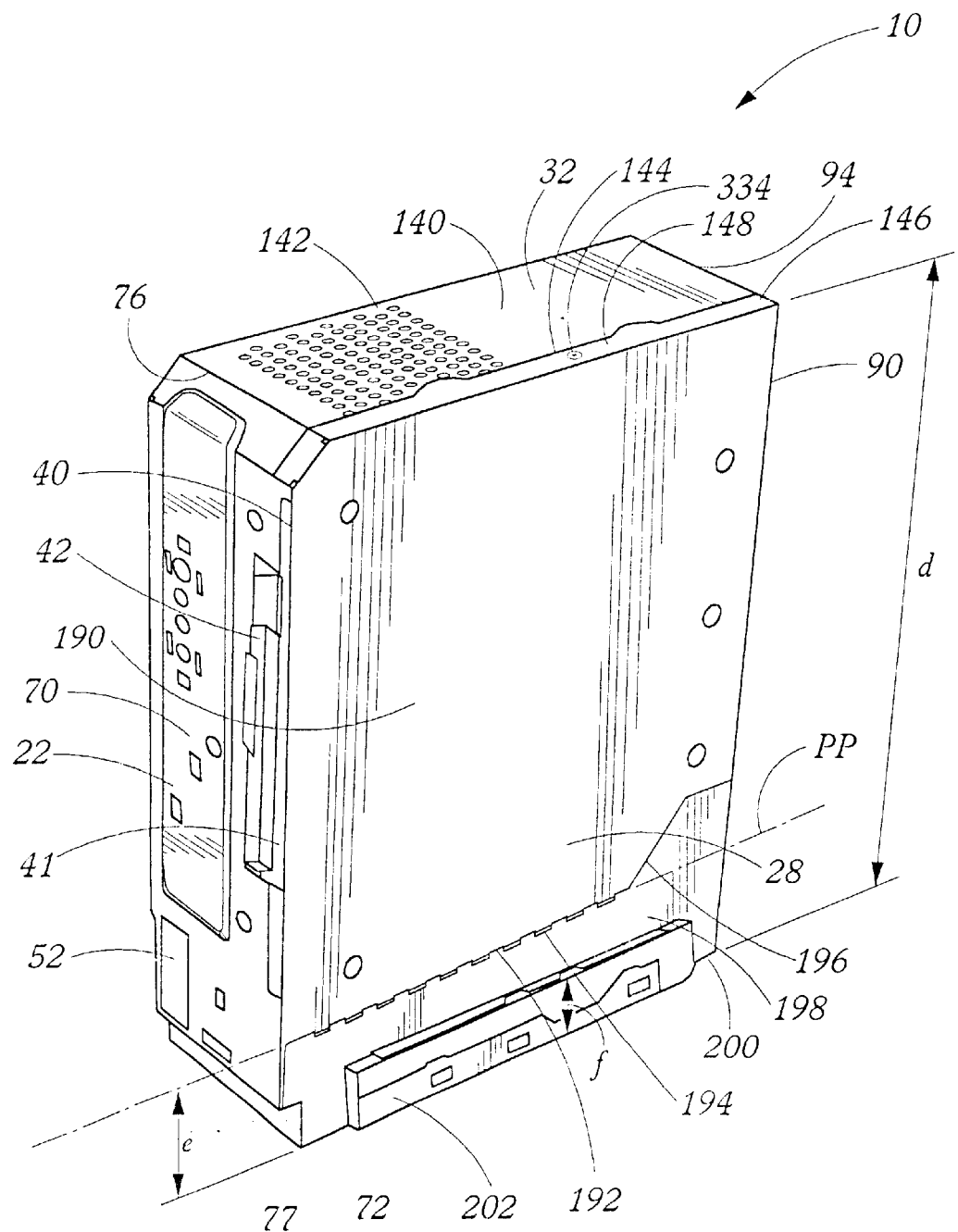
FIG. 4 is a top, front, right perspective view of a computer housing.

The housing 12 comprises a vertically and laterally extending front wall 22; a vertically and laterally extending rear wall 24; a vertically and longitudinally extending left lateral side wall 26; a vertically and longitudinally extending right lateral side wall 28; a longitudinally and laterally extending top wall 32 and a laterally and longitudinally extending bottom wall 34. The front wall terminates at a front wall/left wall vertical edge 38 on one side and front wall/right wall vertical edge 40 on the other side. A vertically extending flange portion 41 from the right wall overlaps the front wall terminating at vertically extending flange edge 43. A first narrow, rectangular, vertically extending opening 42 is positioned in a right side portion of the front wall 22. The opening has a top edge 44 a bottom edge 46 and first and second vertical edges 48, 50. A front face portion 412 of an optical drive extends therethrough as described in further detail below. A second generally rectangular opening 52 having a top edge 54, a bottom edge 56, a first vertical edge 58, and a second vertical edge 60 is positioned in a lower left hand portion of the front wall 22. The front wall comprises a generally flat, vertically and laterally extending panel portion 70 having a lower edge 71 and a top edge 78. Panel portion 70 contains openings 42 and 52. The front wall 22 has a generally flat, bottom recessed portion 72 parallel to portions 70 which has a bottom edge 73 and a top edge 75. Edge 75 and edge 71 define a generally longitudinally and laterally extending step portion 77 as best seen in FIG. 4. The distance between 71 and 75 may be, e.g. 90 mm. The distance between 73 and 75 may be, e.g. 20 mm. As best seen in FIG. 1, a top wall/front wall beveled transition portion 74 extends upwardly and rearwardly from edge 78 to a top edge 76. The distance between edges 76 and 78 may be, e.g. 20 mm.

Figure 3:
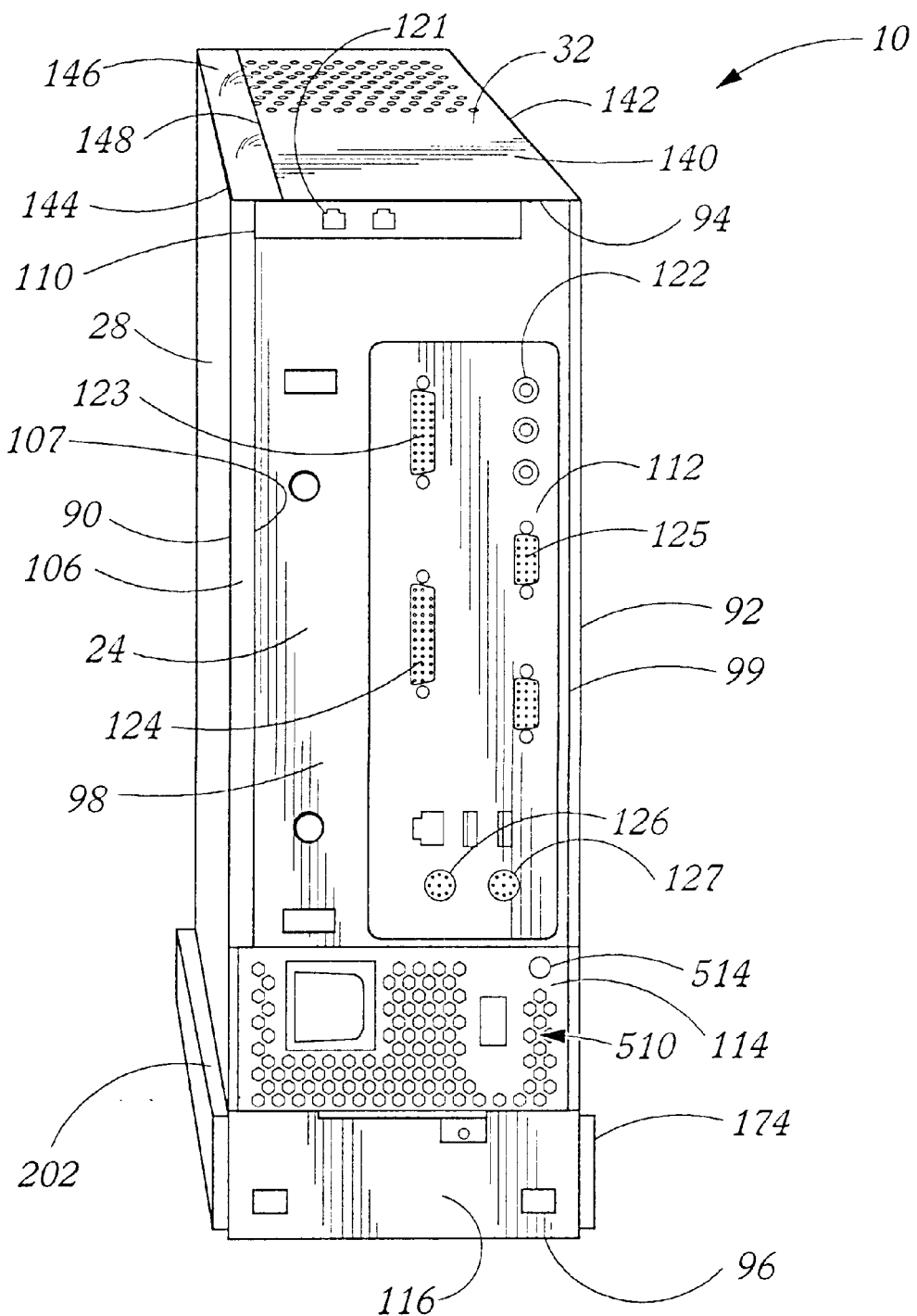
FIG. 3 is a top, rear, right perspective view of a computer housing.

Rear wall 24, FIG. 3, extends laterally between rear wall/right wall vertical edge 90 and rear wall/left wall vertical edge 92 and extends vertically between top edge 94 and bottom edge 96. The rear wall includes an upper generally flat face 98 which is recessed somewhat, e.g. 10 mm, from a first vertical edge strip defined by right wall vertically extending flange portion 106 and a second vertical edge strip 99 which are both longitudinally co-extensive with portion 98. Upper panel portion 98 has a first input/output ("I/O") port area 110 at a top portion thereof and a second I/O port area 112 positioned at an intermediate portion thereof. A power module rear face panel 114, described further below, is positioned immediately below panel portion 98 and a flat lower panel portion 116 is positioned below the power module panel 114.

The I/O ports may comprise conventional ports/connectors such as modem 121, speaker 122, game 123, parallel 124, monitor 125, mouse 126, and keyboard 127 ports, etc., for connecting the computer to typical I/O devices such as keyboards, displays, scanners, joysticks, etc. (none shown).

The top wall 32 comprises a flat horizontal panel 140 extending between a top wall/left wall edge interface 142 and a top wall right wall edge interface 144. A right wall flange 146 forms an overlapping portion of the top wall terminating at edge 148. A plurality of vent holes 152, 154, etc. are provided in the top wall to facilitate venting of air from a motherboard chamber described below.

Left side wall 26, FIG. 1, has a generally flat panel portion 162 extending from edge 92 to edge 38 longitudinally and from edge 142 to bottom edge 164 vertically, except for stair step or bump out portion 168. Stair step portion 168 has a laterally extending, e.g. 5 mm, front face portion 170 longitudinally set back, e.g. 25 mm, from the front wall panel 72 of the housing, and has a similar rear face 174 positioned forward, e.g. 25 mm, from the rear face 24. The stair step portion has a top face 176 and a bottom face which is an extension of bottom wall 34.

Right side wall 28, FIG. 4, has a flat upper panel portion 190 extending longitudinally between edges 40 and 90 and vertically between top edge 144 and a boundary defined by hinge line portion 194 and beveled step shaped edge portion 196. The right side wall also includes a flat bottom panel portion extending longitudinally between edges 40 and 90 and vertically between 194, 196, on the top and bottom edge 200 at the bottom, except for bump out/stair step portion 202 having generally an identical configuration to bump out portion 168 located on the opposite side wall 26.

Figure 5:
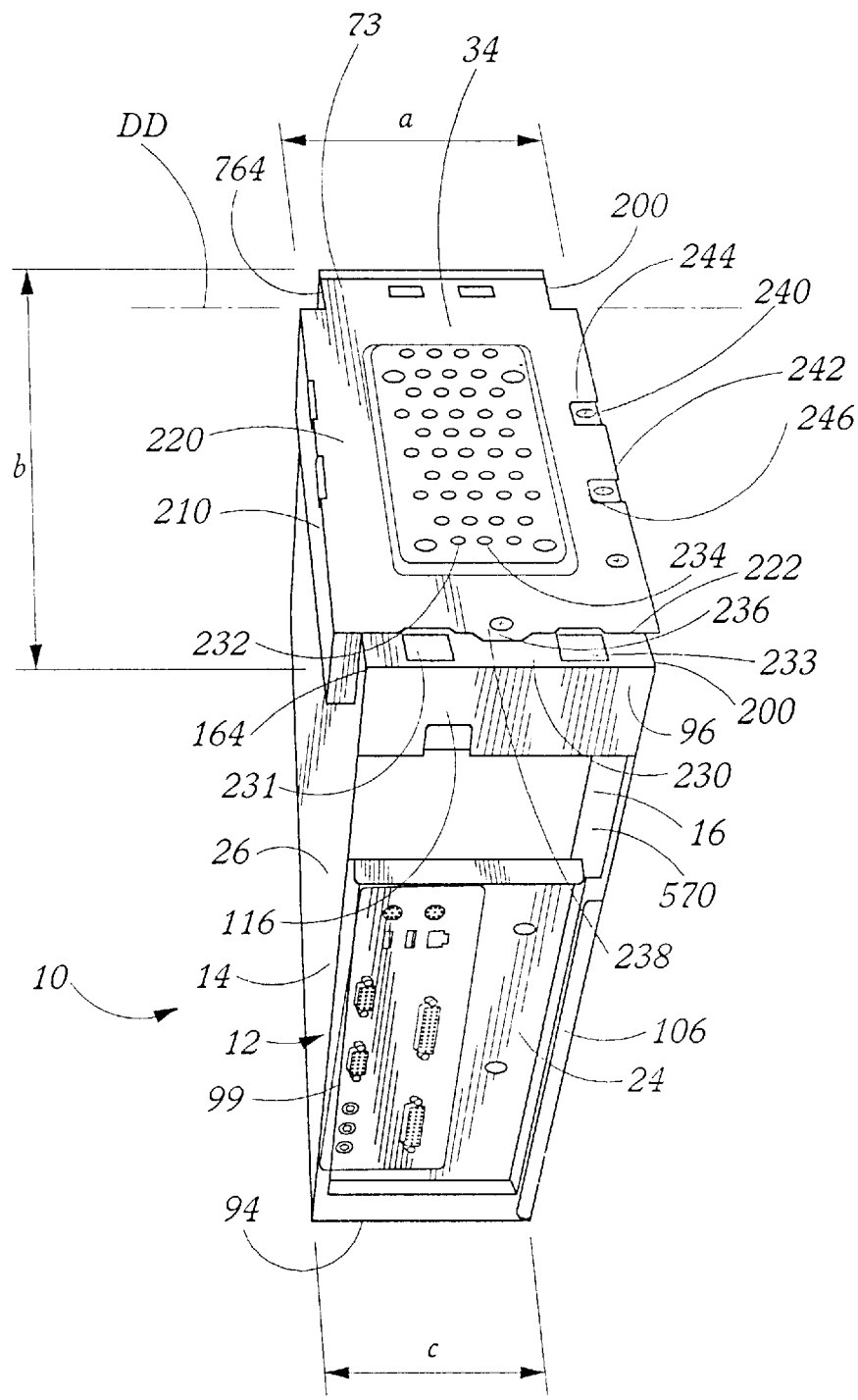
FIG. 5 is a bottom, rear perspective view of a computer housing with a power supply modular removed.
Figure 6:
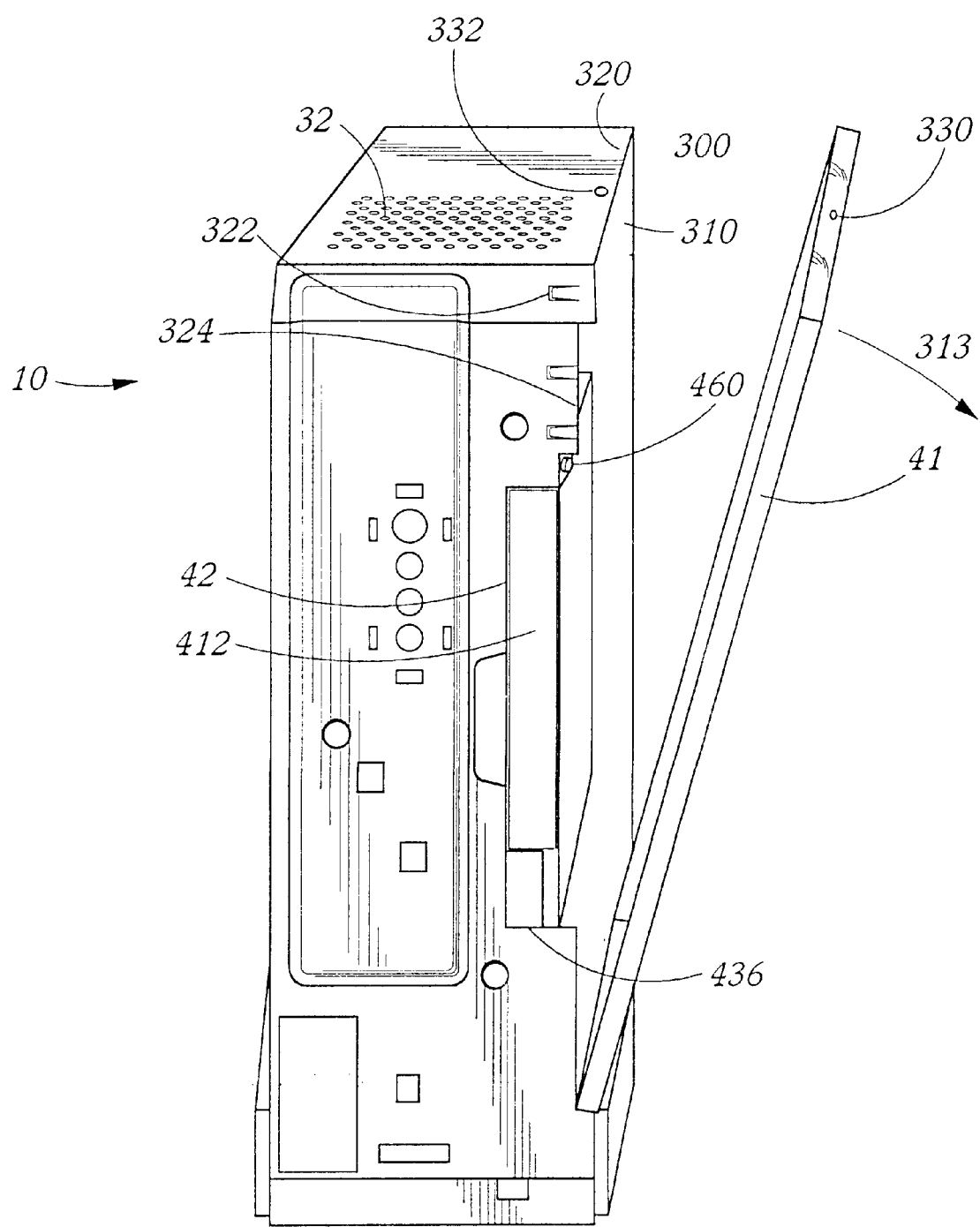
FIG. 6 is a front, right perspective view of a computer housing with a lateral side door panel partially open position.

As best shown by FIG. 5, bottom wall 34 comprises a forward flat panel portion 220 extending laterally between left bump out bottom edge 210 and right bump out bottom edge 212 at an intermediate portion thereof and between edges 164 and 200 at the extreme forward end thereof. The forward panel terminates at a rear edge portion 222 which overlaps with a second flat panel portion 230 which extends on the exposed exterior from edge 222 to rear edge 96. The forward panel 220 has vent openings such as holes 232, 234, etc. or slats (not shown) or the like provided therein and may include a recess portion 236 having a screw 238 received in a bore 766 therein, FIG. 18. Right side recess portions 240, 242 may be provided which have bores therein adapted to received screws 244, 246 for attaching a hard drive to an interior side of the panel 220 as described in further detail below.

Figure 23:
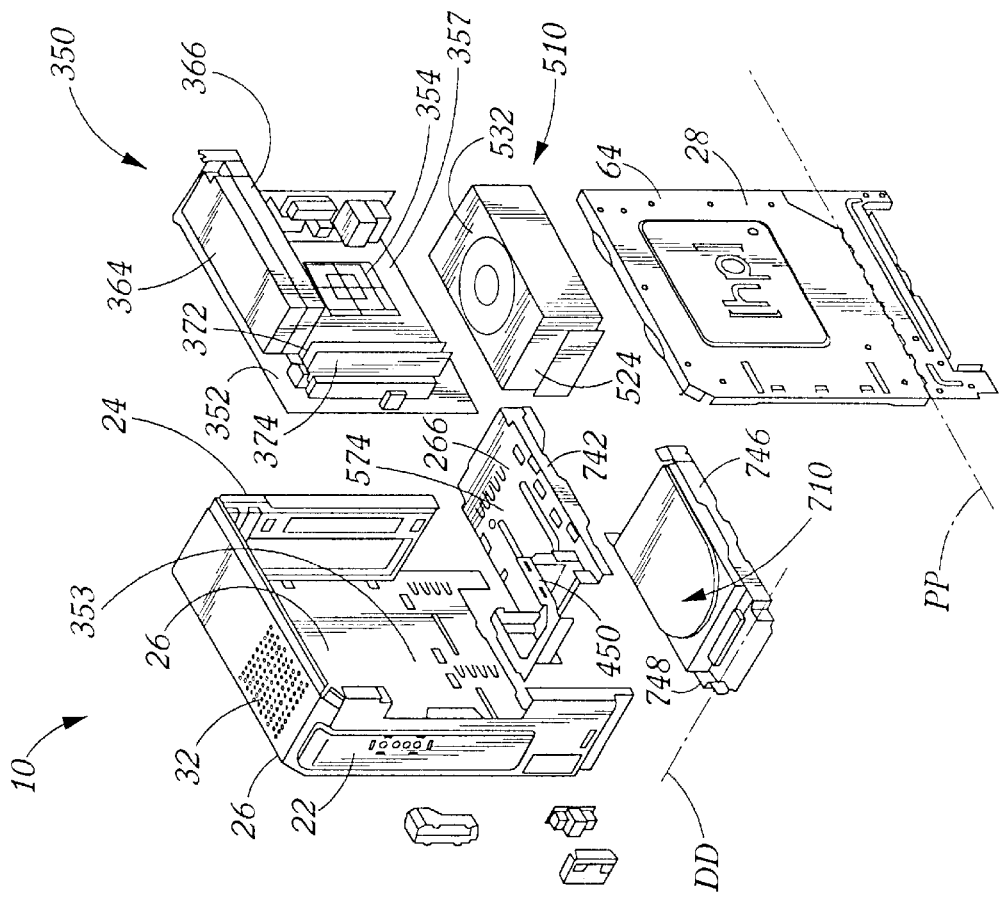
FIG. 23 is a partially schematic, exploded view of a tower computer.
Figure 23:
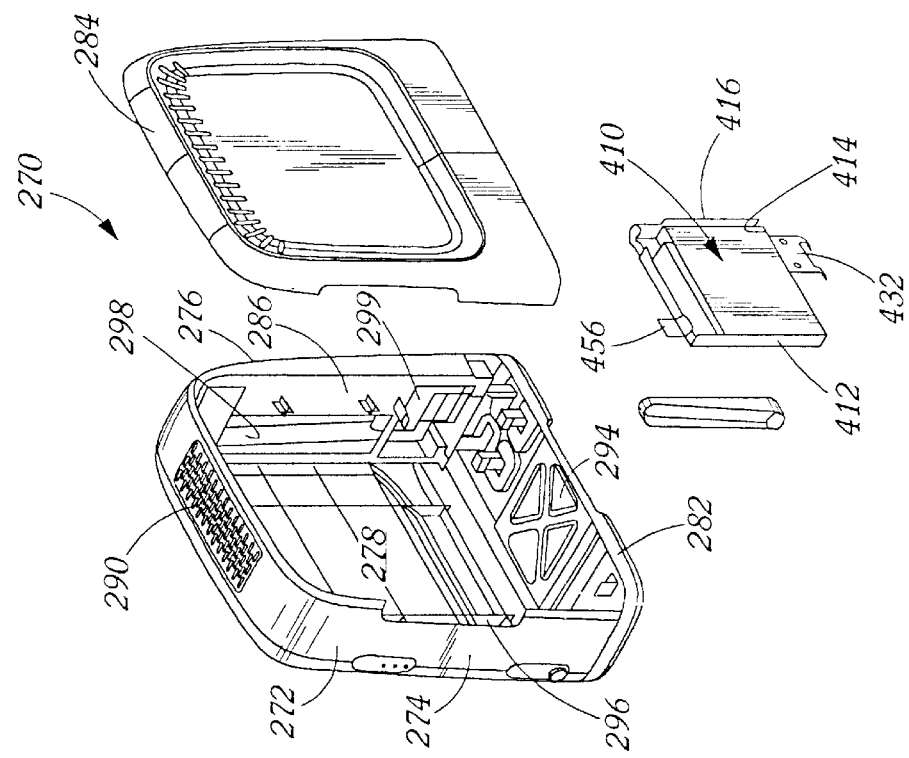

In one embodiment, as illustrated by FIG. 23, the housing 12 may comprise a first integral subassembly 262 which includes front wall 22, left side wall 26, top wall 32 and an upper portion of rear wall 24. A second subassembly 264 is formed by the hinge connected upper and lower portions of right side wall 28. A portion of the rear wall 24 is formed by a rear portion of a power module 510. Another portion of the rear wall is formed by an intermediate wall subassembly 266. This assembly 266 also contains a bottom portion of the rear wall 24 and a portion of the bottom wall 34. The remainder of the bottom wall is in a bottom door assembly 268. The various subassemblies may be connected by conventional sheet metal connection means such as locking flanges, tabs and slots or other cut out portions, screw and threaded bore or screw and nut connection, rivets, solder, welds, etc.

The housing may have the following exemplary dimensions:

a=105 mm, b=239 mm, c=90 mm, d=306 mm, e=70 mm, f=35 mm, as shown in FIGS. 4 and 5. It is to be understood that these dimensions are only exemplary and demonstrate dimensions suitable for accommodating specific computer components described elsewhere herein. It is to be understood that if computer components of different sizes were to be used or if such computer components were arranged somewhat differently than specifically described in the illustrated embodiment that the above exemplary dimensions would change. The variance of these dimensions to accommodate differently sized or other computer components than specifically described herein, would, after reading this disclosure, be obvious to a person with ordinary skill in the art and accordingly will not be further discussed herein. It is to be understood that the invention is not to be limited to any of the above dimensions except to the extent such dimensions are expressly recited in one or more of the following claims.

As shown by FIG. 23, the housing 12 may be encased in an aesthetically pleasing, high strength plastic casing 270 which may comprise a first portion 272 having front 274, rear 276, left side 278, top 280 and bottom 282 walls and a second portion comprising a right side wall 284 adapted to be removeably mounted, as by press release locking tabs, over a side opening 286 in the first portion. The casing may have vent holes in a top portion 290 and a raised bottom portion 294 thereof. Cut outs 296, 298, 299, etc. in the casing 270 are constructed and arranged to expose a removable media drive front face 412, a power supply assembly rear face 512 and the various I/O ports. Preferably the casing is constructed in a manner, e.g. using studs and press release tabs, screws, etc., to enable the housing 12 to be mounted therein or removed therefrom very rapidly, e.g. in less than thirty seconds. However it is to be understood that the definition of "modular" and "readily-accessible" provided below is with reference only to the housing 12 and does not take into account any time which may be required in removing any portion of casing 270 or time which may be required in removing housing 12 from casing 270, if necessary, to access a particular component.

Motherboard Bay

As best illustrated in FIGS. 6–10 the computer 10 has a motherboard access bay 300 accessible through an access opening 310 in the right lateral side 28 of the sheet metal housing 12. The opening is removably covered by a side panel door 312 which may be comprised of side wall flat upper panel portion 190 and flanges 41, 106, 146, FIG. 4. In the illustrated embodiment the side panel door 312 is pivotally mounted to the housing by hinge portions 314, 316 on the door 312 and housing 12 which have a pivot pin (not shown) received therein to define a pivot access PP. The side panel door 312 flange portions 106, 146, 41 overlap the adjacent portion of the rear top and front sides of the housing when the door is shut. These door flange portions co-act with flange portions 318, 320, 322, 324, 326, positioned about the periphery 328 of the access opening 310. More specifically, the flange portions 318, 320, 322, 324, 326 are biased to the position shown in FIG. 7 and are urged elastically inwardly by the flange portions on the side panel door 312 as the door is closed. Thus, the housing and door flange portions have surfaces which abut when the door is closed and those abutting surfaces are urged together by the elastic restorative forces of both sets of flanges. As a result, there is substantial sliding friction between these abutting surfaces which tends to retain the door in a closed position once it has been closed. To further prevent the door from opening a screw 334, FIG. 4 may be received in a hole 330 in door top flange 146 and thread bore 332 in housing top flange 320. Of course, any number of door holding or arrangements might be employed to hold the door in a closed position such as conventional cabinet latching assemblies, snap lock assemblies, hook and catch assemblies, etc.

Figure 9:
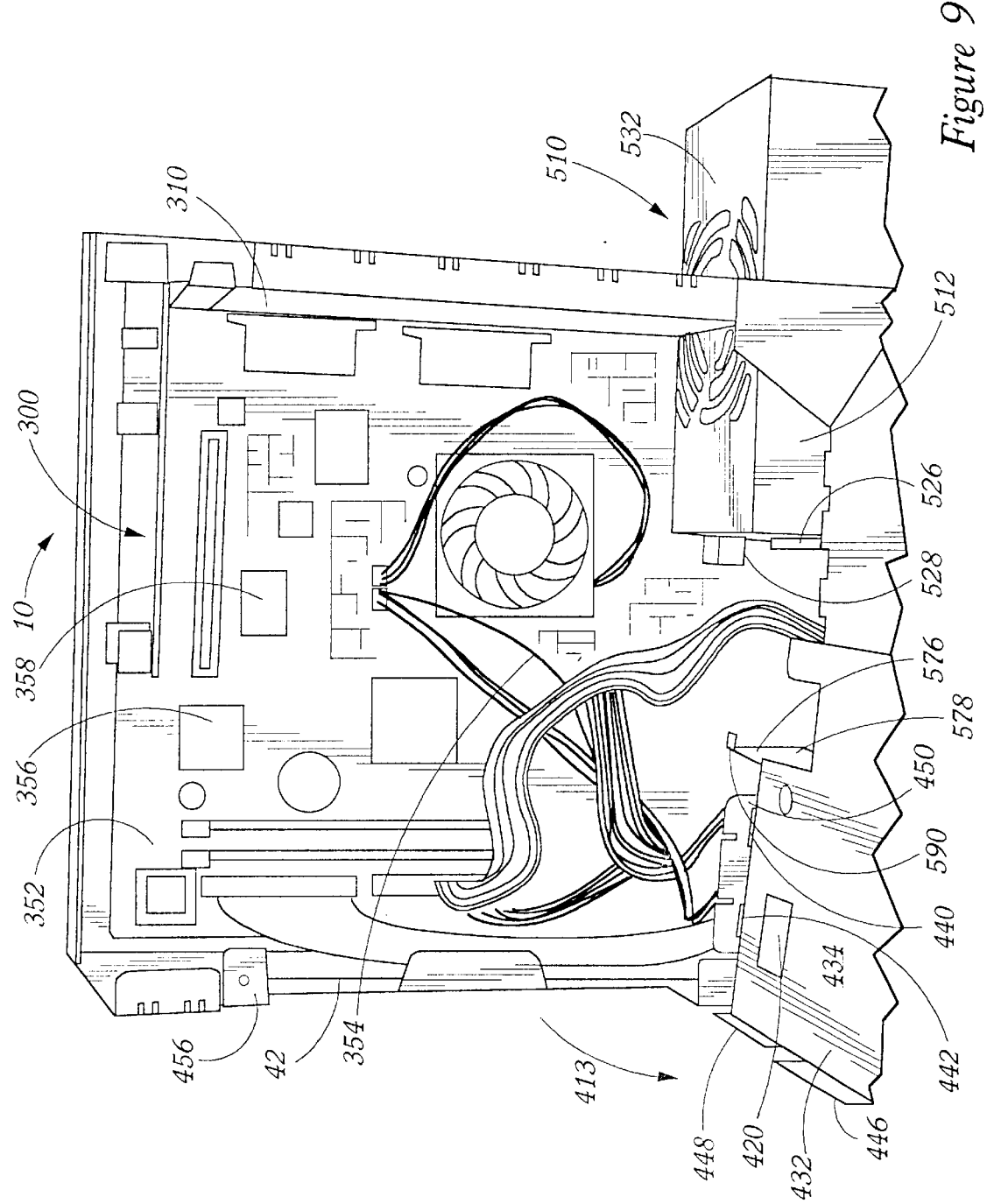
FIG. 9 is a detail right elevation view of a computer housing having a door panel thereof in an open position and showing a power supply assembly in a partially removed state.
Figure 10:
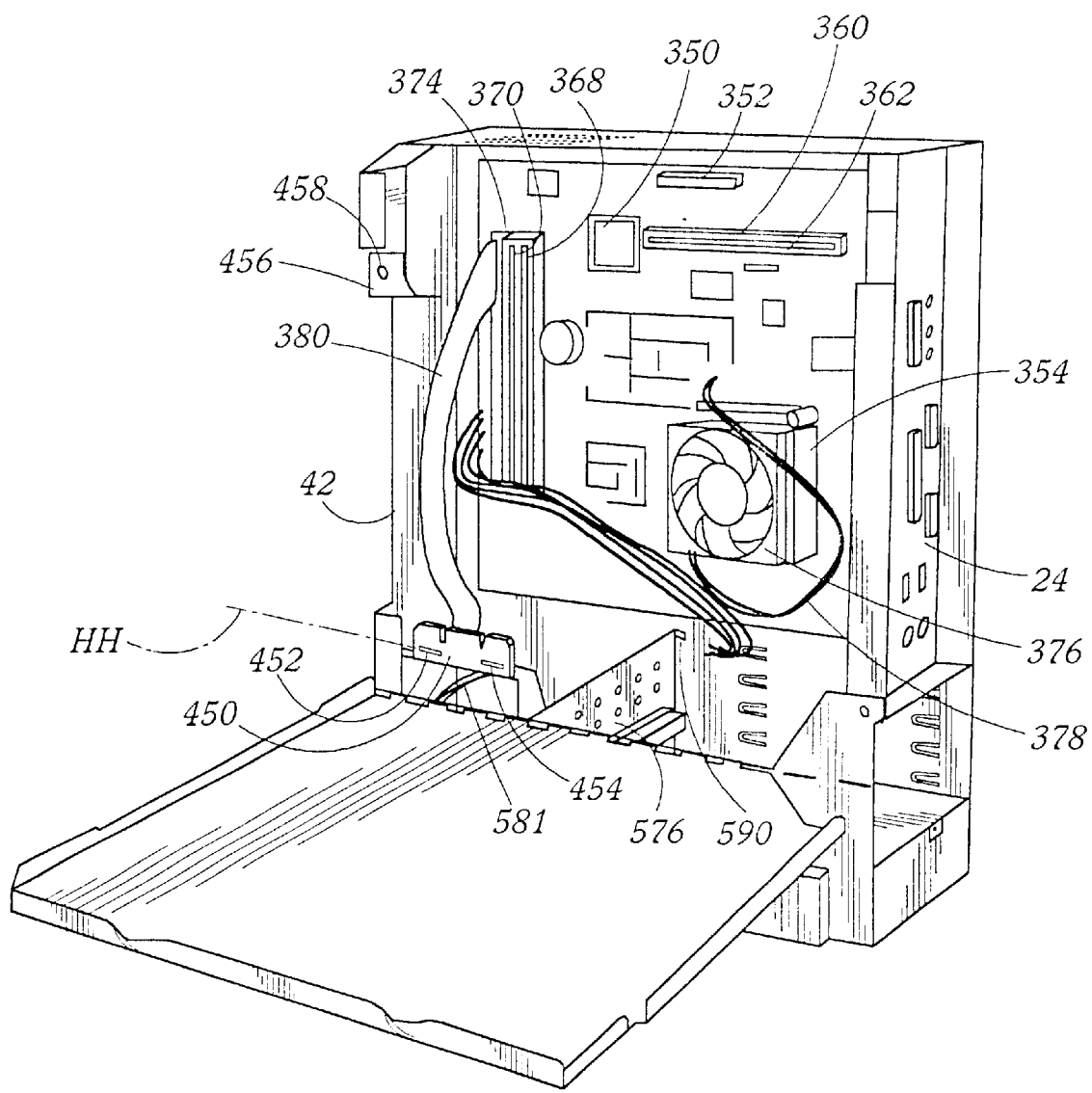
FIG. 10 is a rear, right side perspective view of a computer housing with a lateral side door panel in an open position and with a power supply assembly removed.

A motherboard assembly 350, best illustrated in FIGS. 9, 10, and 23 comprises a substrate 352 having a back side 355 mounted in abutting relationship with an interior wall surface 353 of housing lateral side wall 26. The substrate may be mounted on the wall surface by conventional means, for example by screws, rivets, etc. The substrate 352 has a front side 357 with a central processing unit (CPU) 354 mounted at a central portion thereof. Various circuit devices 356, 358, etc., expansion card slots 360, 362, for receiving expansion cards 364, 366, FIG.23, therein; memory chip slots 368, 370 for receiving memory chips 372, 374 therein; etc., are provided on the substrate 352. A CPU cooling fan 376 may be mounted directly on the CPU. The various components of the motherboard assembly are sometimes referred to herein as "motherboard components" or as being "mounted on the motherboard."

Various signal and power cables 378, 380 extend into the motherboard bay 300 and are operably connected to the motherboard assembly. The motherboard assembly may be of different types having different sizes and shapes. In the illustrated embodiment the motherboard is an Intel Micro ATX form factor motherboard having a rectangular shape with dimensions up to 190.5 mm in height (as assembled in housing) by up to 216 mm in length. The motherboard bay 300 preferably has substantially the same length and height as the motherboard and has a width about the same as the housing width "c" which in the exemplary embodiment is 90 mm. The motherboard bay preferably has a length to width ratio of at least 1.5 and preferably at least 2.0 and most preferably at least 2.5. The motherboard may be conventionally electrically connected to the various I/O ports, media drives, power supply, etc. Except for these various electrical connector cables the motherboard bay 300 is substantially free of other computer components (for example free of other computer components except for a media drive) thus a relatively large amount of cooling air space within the motherboard bay is provided. In preferred embodiments the motherboard bay 300 is at least 80% free air space and, more preferably, at least 85% free air space and most preferably 89%±5% free air space.

The sheet metal walls around the motherboard bay 300 provide EMI shielding as well as physically protecting the motherboard assembly and creating a plenum chamber for providing a cooling airflow over the motherboard assembly.

Removable Media Drive

One computer component other than the motherboard assembly 350 which is located in the motherboard bay 300 is a media drive assembly 410 which in the illustrated embodiment is a removable media drive such as an optical CD or DVD drive having a rotation access RR. The drive has central intersecting longitudinal lateral and vertical axes $X_1X_1, Y_1Y_1, Z_1Z_1$. Axis RR is disposed laterally and horizontally when the drive is in its normal operating position shown in FIGS. 7 and 8.

Figure 2:
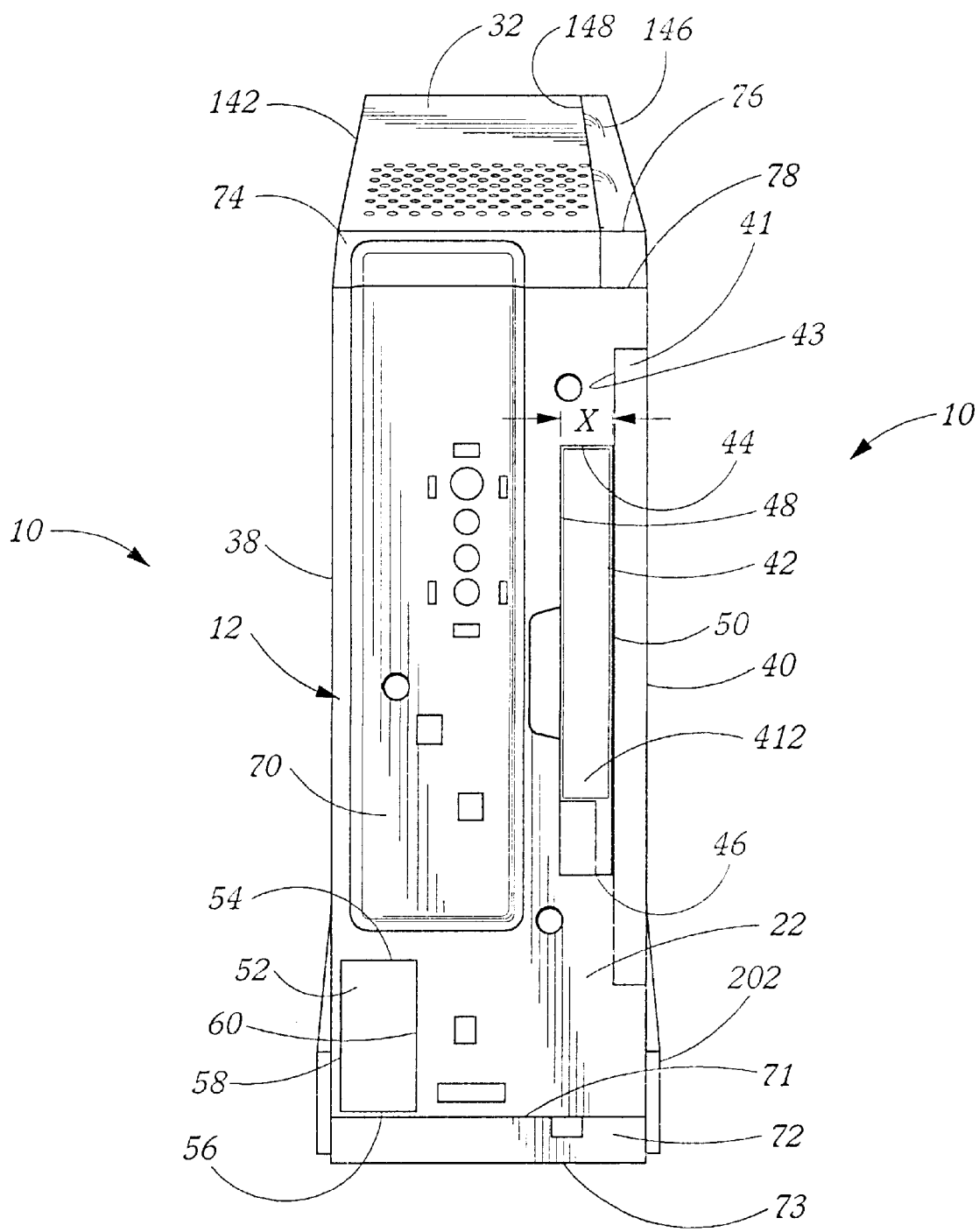
FIG. 2 is a top, front perspective view of a computer housing.

The removable media drive 410 has a front face 412 which is positioned in the first opening 42 in the front wall 22, FIGS. 1 and 2. The front face 412 may be for a drive of the type which receives an optical disk through a front slot portion thereof or, alternatively, and as shown in the illustrated embodiment may be of the type which has a longitudinally displaceable tray which projects outwardly from the front face (not shown) to enable placement of a media disk on a drive spindle (not shown). Both types of disk loading mechanisms are well known in the art and will not be further described herein. The drive front face may have a vertical dimension "j" of e.g., 130 mm.

Figure 7:
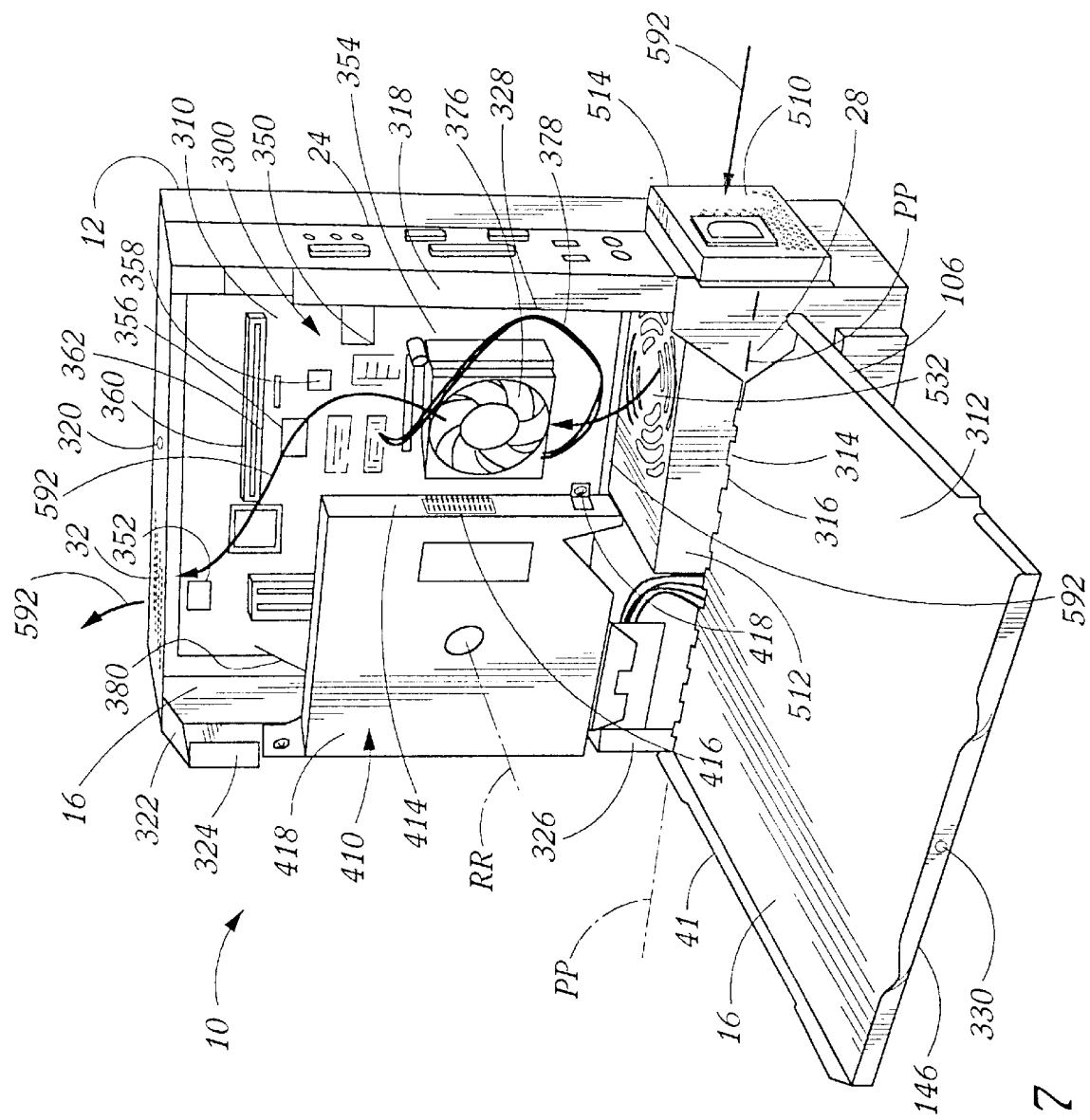
FIG. 7 is a rear, right perspective view of a computer housing with a lateral side door panel in an open position and with a power supply assembly partially removed.
Figure 8:
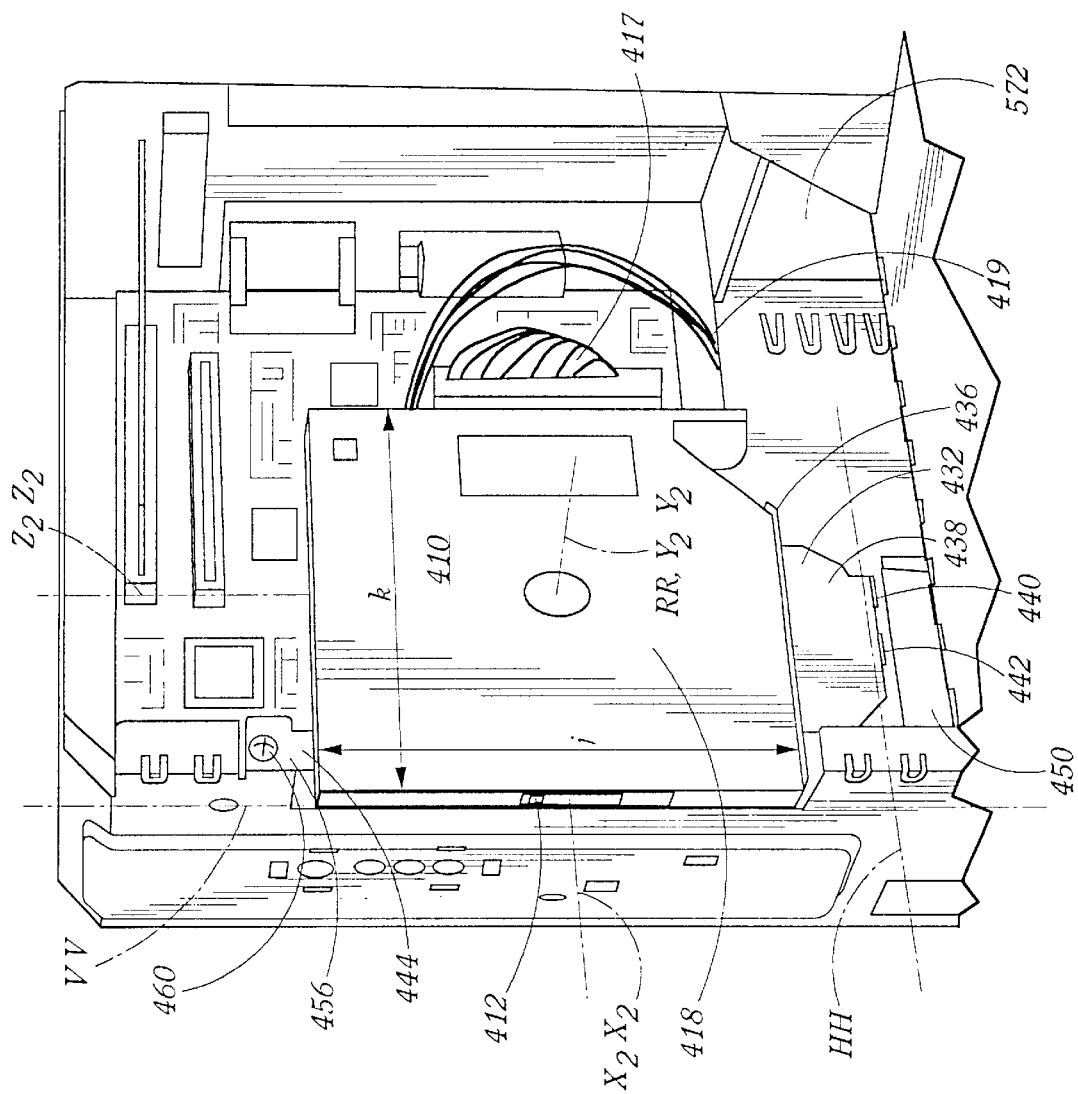
FIG. 8 is a detail front, right perspective view of a computer housing with a lateral side door panel in an open position and with a power supply assembly removed.

The drive has rear face 414 which may have a signal cable adapter 416 mounted thereon for removable connection to a signal cable 417 and may also have a power cable adapter 418 mounted thereon for removable connection to a power cable 419. FIG. 8 illustrates the drive 410 with cables connected and FIG. 7 illustrates the drive with cables removed. The drive further comprises a first and second lateral side faces 418, 420 which may have a longitudinal dimension "k" of 130 mm, and a top face 422 and bottom face 424 having a lateral dimension "l", FIG. 2, which may be e.g., 13 mm.

The drive 410 is mounted on a drive bracket 432 having vertically and longitudinally extending body portion 434, FIG. 9, which abuts drive side wall 420. The bracket 432 also includes a horizontally extending lower portion 436, a vertically extending lower tab portion 438 and curved foot portions 440, 442 projecting from the lower tab portion 438. The bracket further comprises an upper tab portion 444, FIG. 8, having a screw receiving hole therein and front alignment tabs 446, 448, FIG. 9.

A second bracket 450 fixed to the housing as by screws (not shown) attached to an intermediate horizontal wall 574, FIG. 23, has longitudinally extending slots 452, 454, which define a pivot axis HH.

A top drive mounting flange 456 is fixedly attached, e.g. integrally, to the housing and may have a screw hole therein 458 which is alignable with the screw hole in upper tab portion 444 whereby a screw 460 may be used to secure upper tab portion 444 to flange 456. Various alternative releasable attachment means could of course be used in place of the screw attachment, for example a spring metal tab (not shown) or hook and catch (not shown), etc.

The lower curved foot portions 440, 442 of bracket 432 may be slidingly, rotationally displaceably, received in slots 452, 454. The curved foot portions 440, 442 and the bottom bracket 450 hold the lower portion of drive bracket 442 in stable stationary relationship with the housing 12 when the upper tab portion 444 is secured to top drive mounting flange 456. When the upper end is released the drive 410 and attached bracket 442 may be pivoted horizontally about axis HH to the generally horizontally disposed position shown in FIG. 9. Thereafter, if desired, the drive and attached bracket 442 may be moved laterally away from bracket 450 to entirely remove foot portions 440, 442 from slots 452, 454 and thus detach the drive and attached drive bracket 442 from the housing 12. The signal and power and audio cables 417, 419 may be hand disconnected from the back of the drive, either before or after disengagement of the drive from bracket 450, to enable the drive to be completely removed from the housing for replacement, repair, etc., FIG. 10.

It will of course be appreciated that with the drive positioned in the pivotally displaced position shown in FIG. 9 or entirely removed from the housing as shown in FIG. 10 that all regions of the motherboard assembly 350 are easily accessible. Thus a user may quickly and easily add expansion cards or memory to the computer without using special tools and without technical skills or training. Similarly a technician may quickly and easily access and test any portion of the motherboard assembly 350. In the illustrated embodiment it is necessary only to remove screw 334 from the top of access 312 door; open the door 312 by pivoting it in direction 313, remove screw 460 or release a spring tab, etc., from drive bracket tab 456, pivot the drive in direction 413 and, if necessary, hand remove cables 417 and 419. The entire operation can typically be performed by a person with no technical experience who has recently performed the same operation at least once before, in less than three minutes. Thus the entire motherboard is readily-accessible. The phrase "readily-accessible" when used herein to refer to a computer component such as a motherboard means that unobstructed access may be obtained to that computer component by an average person, with no technical experience who has recently performed the same operation at least once before, in less than three minutes and without using special tools. It is to be understood that this definition of "readily-accessible" is with reference only to the housing 12 and does not take into account any time which may be required in removing any portion of casing 270 or time which may be required in removing housing 12 from casing 270, if necessary, to access a particular component.

Although a lower horizontal pivot axis HH has been described with reference to the illustrated embodiment, it is also to be understood that by flipping the relationship of the various bracket components, an upper horizontal pivot access could easily be provided. Further, it will be understood that by pivotally mounting a drive bracket such as 432 about a vertical pivot access such as VV, FIG. 8, at a front end portion of the drive, that the drive would also be pivotally displaceable about such a vertical axis to enable access to motherboard components positioned behind the drive 410.

It is to be noted that the drive 410, in its normal operating position illustrated in FIGS. 7 and 8, is positioned with one lateral face 418 positioned next adjacent to side panel door 312 (when the door is in the closed position) and with its smallest dimension "l" projecting into the motherboard bay 300. Thus, the drive 410 is positioned in substantially nonrestricting relationship with airflow through the motherboard bay 300 while in its normal operating position, i.e. the airflow rate through the motherboard bay with the drive in this position is at least 90% as great as the airflow rate with the drive completely removed.

Also, the drive 410 is readily-displaceable from its normal operating position, shown in FIG. 8, to a position in noninterfering relationship with the motherboard, such as shown in FIG. 9, to enable access to portions of the motherboard that are positioned behind the drive 410 when the drive is in its normal operating position. The phrase "readily-displaceable" when used herein means that a component may be moved from the one referenced position to the other by an average person with no technical experience who has recently performed the same operation at least once before, in less than three minutes and without special tools. It is to be understood that this definition of "readily-displaceable" is with reference only to the housing 12 and does not take into account any time which may be required in removing any portion of casing 270 or time which may be required in removing housing 12 from casing 270, if necessary, to displace the particular component from one position to the other.

Drive 410 is also modular. The term "modular" when used herein to refer to a computer component means a component which may be completely removed by an average person with no technical experience who has recently performed the same operation at least once before, in less than three minutes and without special tools. It is to be understood that this definition of "modular" is with reference only to the housing 12 and does not take into account any time which may be required in removing any portion of casing 270 or time which may be required in removing housing 12 from casing 270, if necessary, to remove the particular component. The phrases "readily-removable" or "readily-removably-mounted" are also used herein to refer to a component which is "modular," as defined above.

Power Supply Assembly

Figure 11:
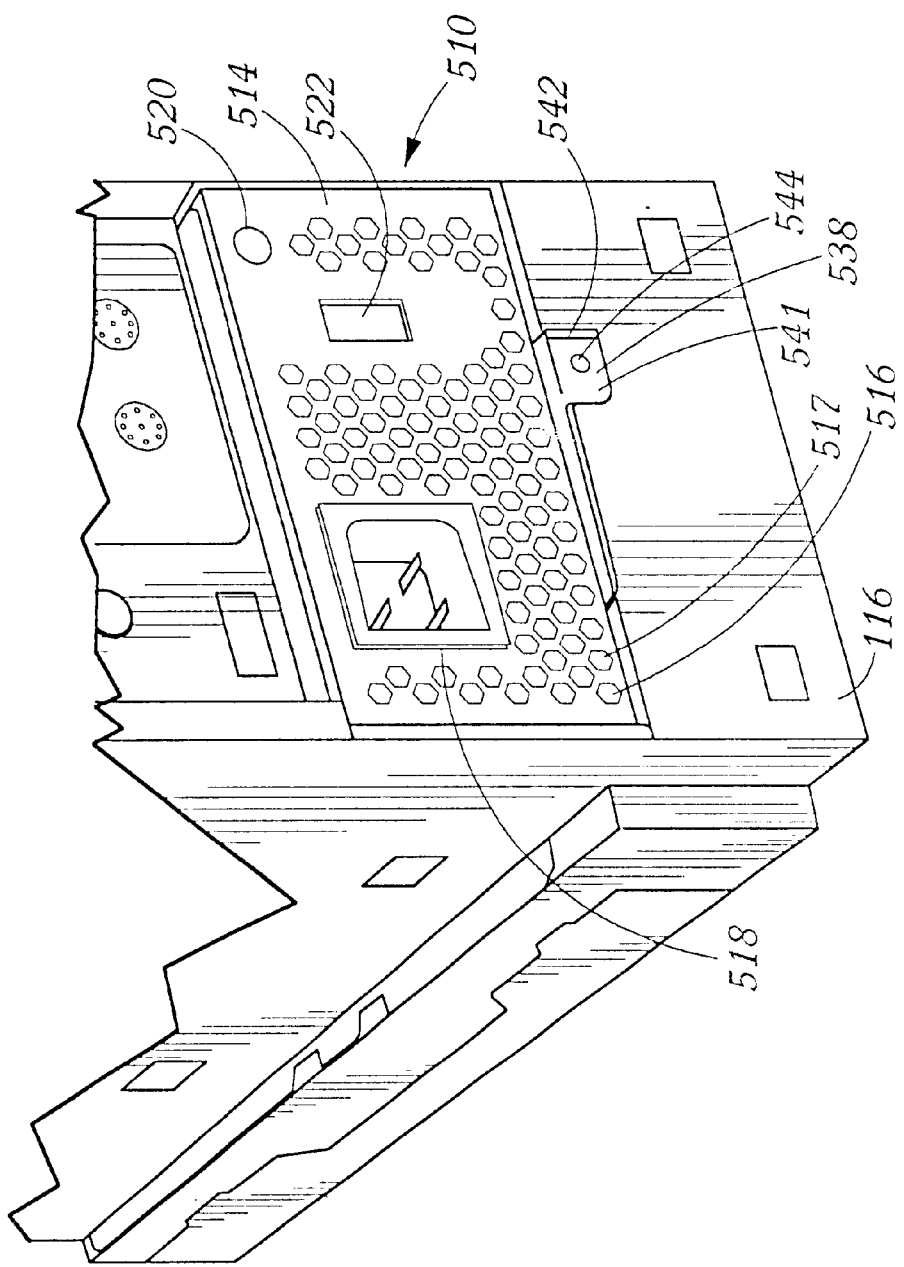
FIG. 11 is a detail, rear, right perspective view of a lower portion of a computer housing with a power supply assembly in a seated position.

A power supply assembly 510 for computer 10 is best illustrated in FIGS. 3, 7, 9, and 11–16. The power supply assembly 510 comprises a parallelepiped shaped housing 512 having a rear face 514 which, in its normal operating position, provides a portion 114 of housing rear wall 24, FIG. 3. The rear face 514, as best shown in FIG. 11, has a rectangular shape and has a plurality of vent holes 516, 517, etc. It also has a power cord socket 518; an indicator light 520, which indicates that the power supply if functioning normally; and a universal voltage selector switch 522, all of which are conventional and well known in the art.

The housing 512 has a relatively flat rectangular front face 524 having a high density power connector 526 mounted at a lower portion thereof and an AC interlock 528 mounted at an upper corner portion thereof. Power connectors and AC interlocks are well known in the art.

Housing 512 has a top face 532 having a plurality of airflow openings 534 provided therein.

Figure 14:
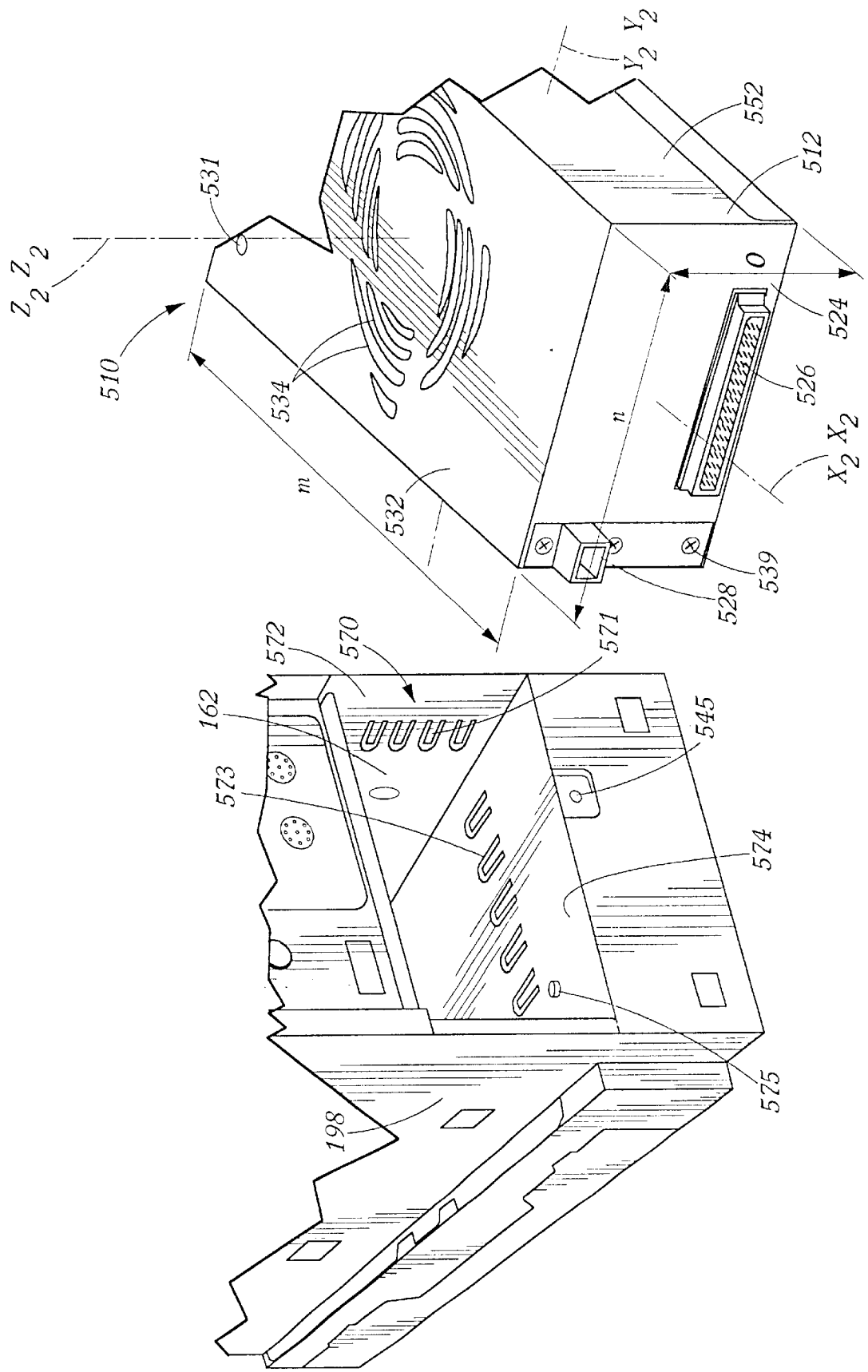
FIG. 14 is a detail, rear, right perspective view of a lower portion of a computer housing with a power supply assembly removed.
Figure 15:
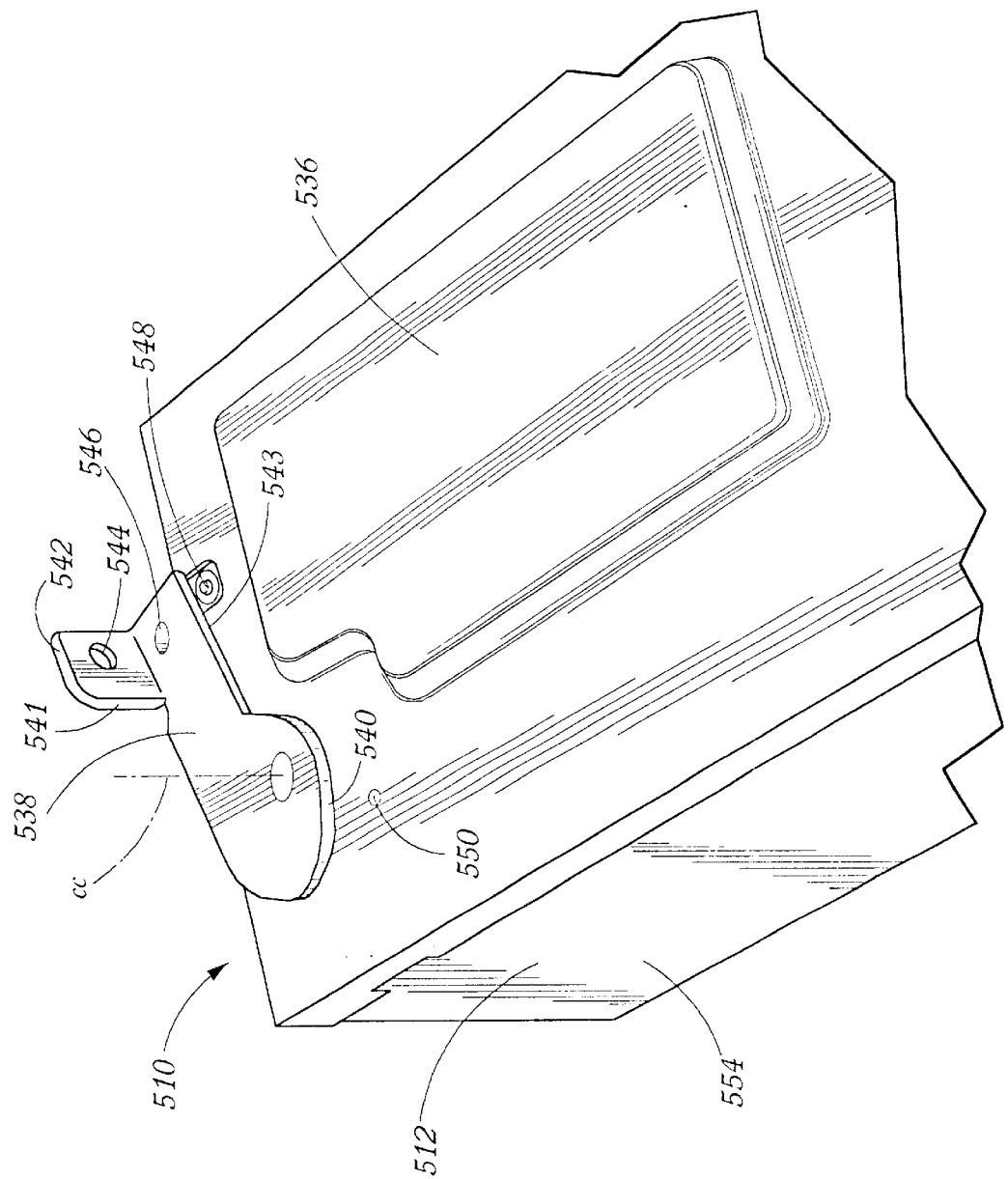
FIG. 15 is a bottom, right perspective view of a rear portion of a power supply assembly.

The power supply housing 512 has a flat rectangular bottom face 536 having a cam lever 538 rotatably mounted thereon, FIG. 15. Cam lever 538 has a vertically extending rotation access CC and a vertically extending cam surface 540. A first vertical tab portion 541 and a second vertical tab portion 542 are provided at the free end 543 of the cam lever. The first tab portion 541 has a hole 544 extending therethrough. Hole 544 is alignable with a corresponding hole 545 in the housing rear wall portion FIG. 14. The cam lever 538 also has a vertically extending detent hole 546 therein adapted to receive a detent stud 548 which is vertically defectively mounted on the bottom face 536 as by a partially cut out, cantilevered, sheet metal tongue supporting the upstanding post.

Figure 16:
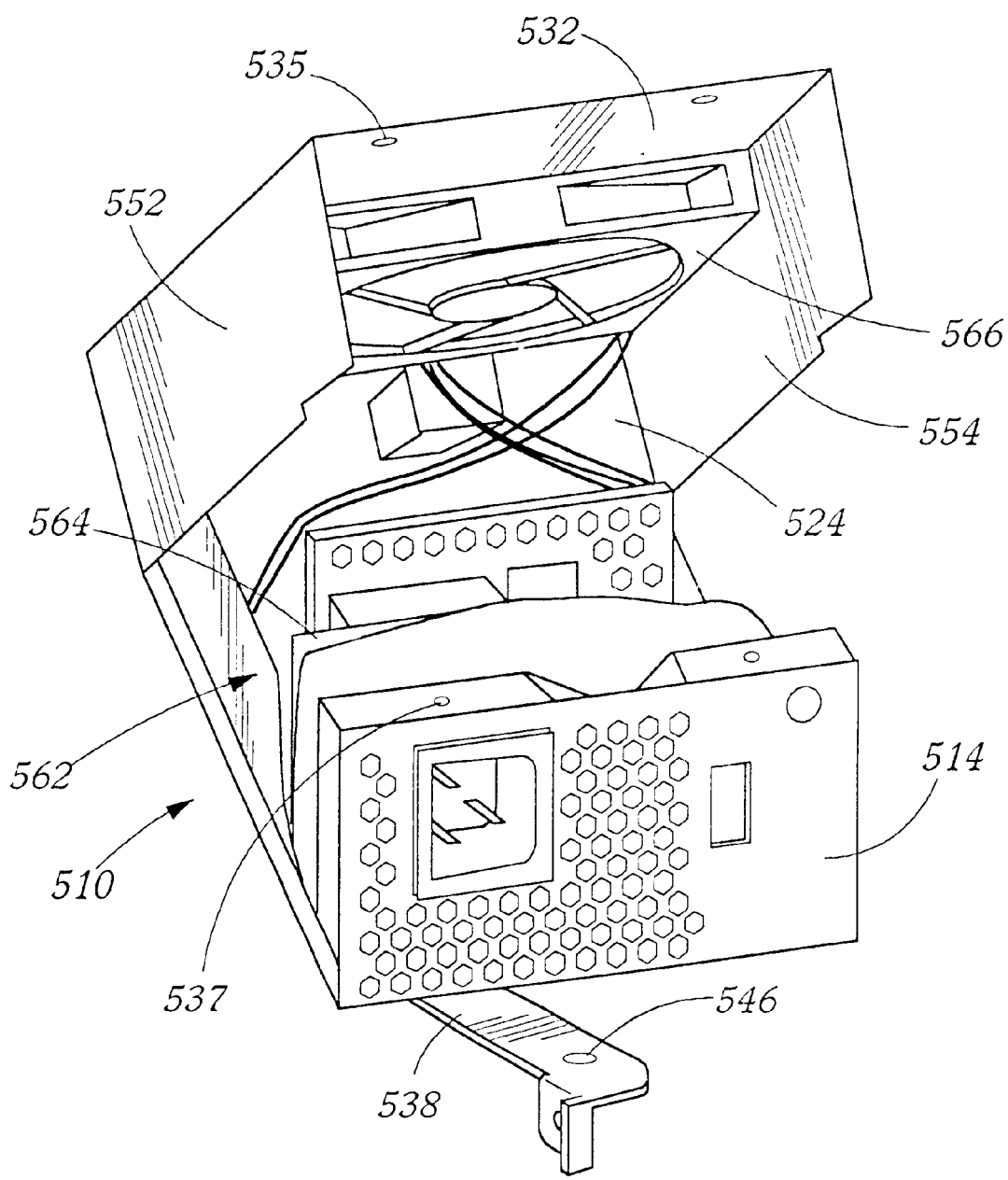
FIG. 16 is a top, rear perspective view of a partially disassembled power supply assembly.

The power supply housing 512 further includes a rectangular right face 552 and a rectangular left face 554. In one exemplary embodiment the power supply has a longitudinal dimension or length "m" of 152 mm, a lateral dimension or width "n" of 83 mm and a vertical dimension or height "o" of 57 mm. It has central intersecting longitudinal lateral and vertical axes $X_2X_2$, $Y_2Y_2$, $Z_2Z_2$. As best illustrated in FIG. 16 the modular power supply assembly 510 includes an electrical power assembly 562 having various electrical components 564, etc. which may be conventional power supply components. The electrical power supply assembly 510 also comprises a power supply cooling fan 566 mounted inside hosing 512. Preferably the electrical components 564, etc. are provided in a lower portion of the housing and cooling fan 566 is fixedly attached to the wall defining top face 532 with the rotation access of the fan positioned parallel to the central vertical axis $Z_2 Z_2$ of the power supply assembly.

Figure 17:
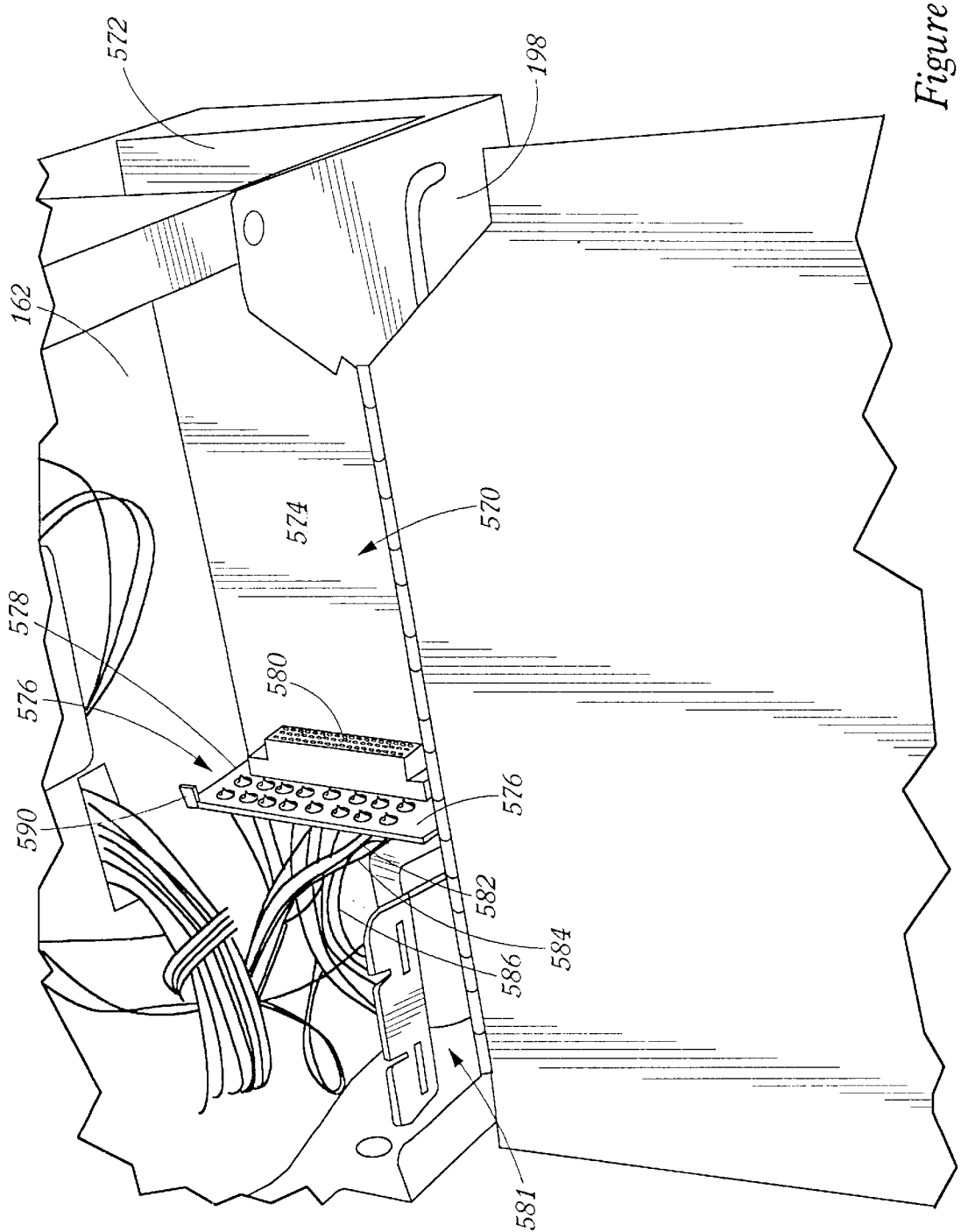
FIG. 17 is a detail top, right perspective view of a lower portion of a computer housing with a lateral side door panel in an open position and illustrating details of a power supply bay.

The power supply assembly 510 is slidingly receivable in a power supply bay 570, FIG. 17, having a rectangular bay access opening 572. Opening 572 has substantially the same shape as the front and rear faces of the modular power supply housing 512 with slightly larger dimensions, e.g., 2 mm larger in each of the vertical and lateral directions. The bay 570 is defined by a longitudinally and a laterally extending wall 574 which is horizontal in the normal operating position of the computer 10. Wall 574 is positioned a short distance, e.g. 32 mm above and extends parallel to the housing bottom wall 34. A cam post 575, FIG. 14, is mounted on intermediate wall portion 574 and co-acts with cam lever 538 on the power supply housing 512. Its relative position with respect to the cam surface of the cam lever is shown at 550 in FIG. 15.

The power supply bay 570 is also defined by vertically and longitudinally extending lower panel portion 198 of the right side wall and lower panel portion 162 of the left side wall. As best illustrated by FIG. 17 the forward end of the power supply bay 570 is defined by a generally vertically and laterally extending electrical connector assembly 576 which includes a substrate 578 upon which is mounted a high density power connector socket 580 which in the illustrated embodiment is a female socket. The substrate has a plurality of power lines 582, 584, 586 connected to a forward portion thereof which are in turn connected through the substrate to the socket 580. The electrical connector assembly 576 also defines a rear portion of a lower forward chamber 581 through which various power and signal lines are passed to connect various computer components. The electrical connector assembly 576 also has an AC interrupt actuator stud 590 mounted therein which co-acts with the AC interrupt 528 mounted on the front wall of the modular power supply housing 512.

The normal operating position of the modular power supply within the power supply bay 570 is with male supply socket 526 positioned in seated mating relationship with female power supply socket 580 and with AC interrupt actuator stud 590 positioned in mating engaged relationship with the AC interrupt 528. This position is illustrated in FIG. 3 and 11 in which rear wall portion 510 of the power supply housing in positioned in flush relationship with lower panel 116. In this normal operating position the cam lever 538 is positioned slightly to the right of center of the power supply rear face with screw hole 544 thereof in alignment with housing panel 116, screw hole 545. A recess 547 may be provided in panel 116 to receive the cam lever first tab portion 541 in abutting relationship therewith. To prevent accidental actuation of the cam lever a screw (not shown) may be inserted through hole 544 and screwed into threaded bore 545. The cam lever 538 is maintained in the position illustrated in FIGS. 3 and 11 even without a screw through bores 544 and 545 by the co-action of detent hole 546 with detent stud 548.

Figure 12:
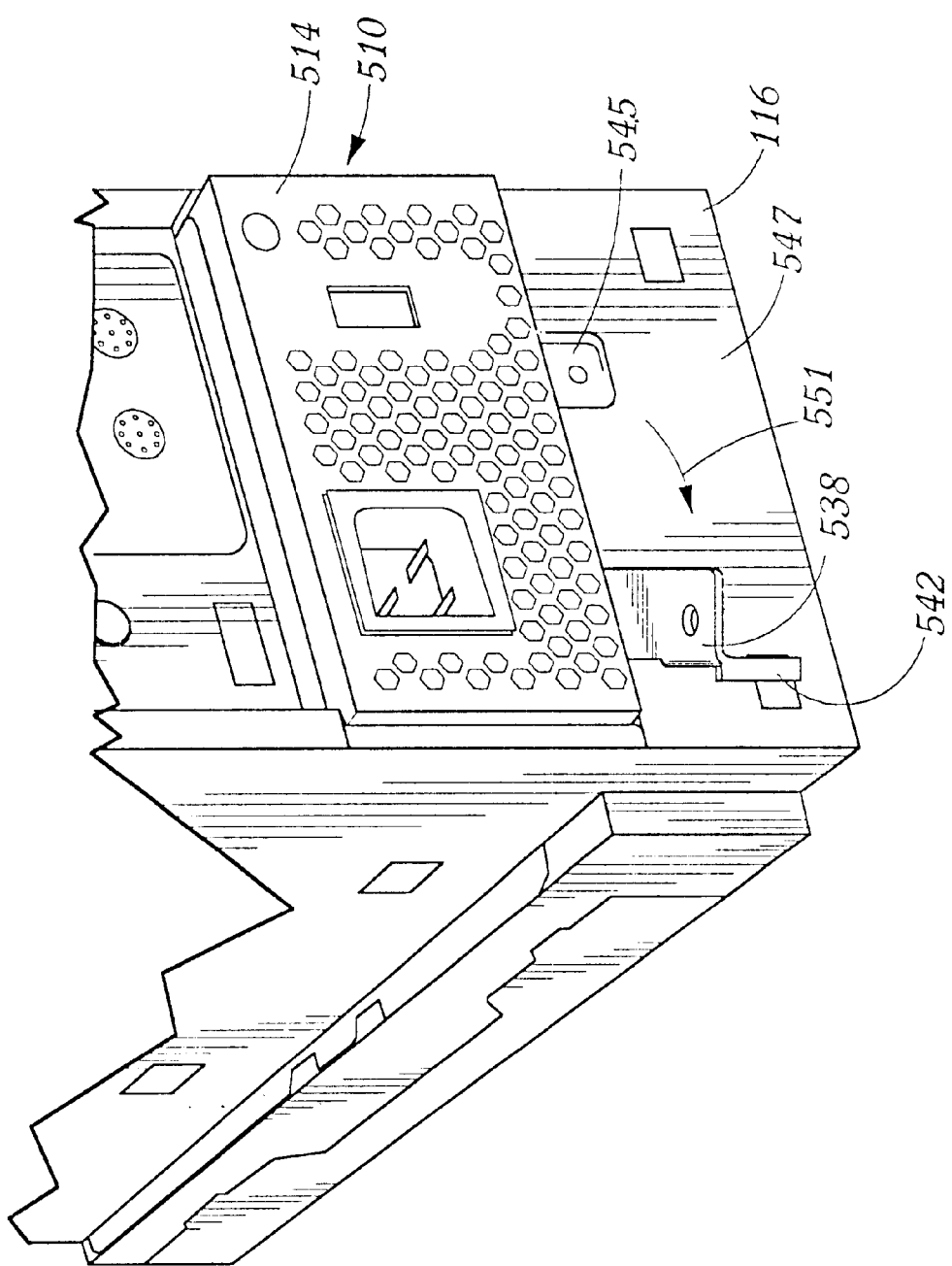
FIG. 12 is a detail, rear, right perspective view of a lower portion of a computer housing with a power supply assembly in an unseated position and with a cam lever in an actuated position.

To remove the modular supply assembly 510 from power supply bay 570 cam lever 538 is engaged, as with a person's thumb positioned on the right side of tab portion 542, and urged to the left as indicated at 551 in FIG. 12. The hand application of force in direction 551 is sufficient to cause the detent stud 548 to be displaced out of the detent hole 546 and thus allow movement in direction 551. As further indicated in FIG. 12 and also in FIG. 7 the movement of the cam lever in direction 551 causes cam surface 540 to co-act with cam stud 575 and thus move the attached power supply assembly 510 rearwardly to the position indicated in FIGS. 12 and 7. In this position the high density power socket 526 has been disconnected from corresponding socket 580 in the power supply bay and AC interrupt 528 has been displaced from AC interrupt stud 590 sufficiently to trip the AC power supply connection.

Typically, the AC interrupt is set to trip much sooner than the high density power socket disconnection point. For example, the AC interrupt may be disconnected after 2 mm rearward travel whereas the high density connector 526 will be disconnected after about 5 mm of rearward travel.

Figure 13:
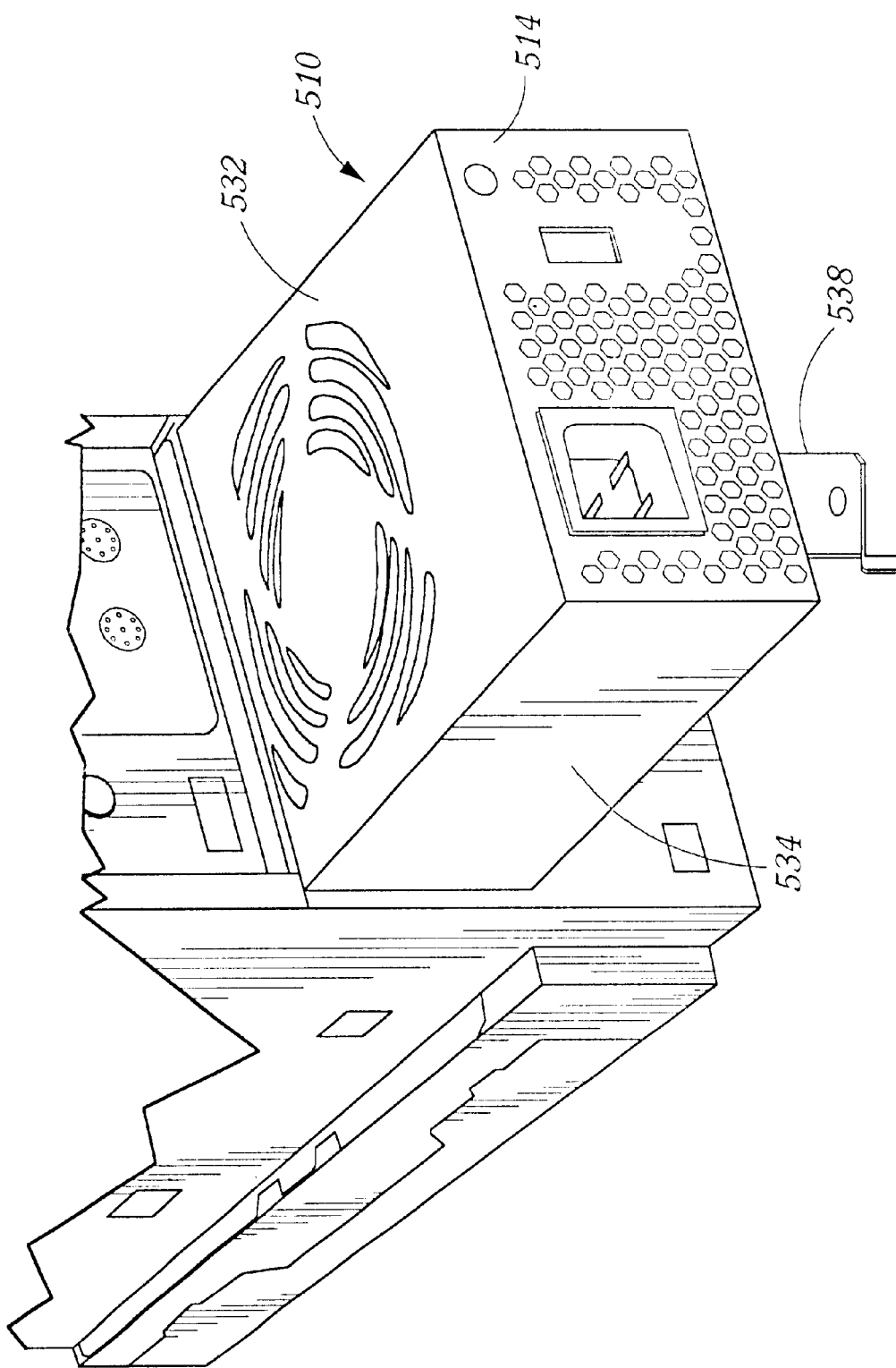
FIG. 13 is a detail, rear, right perspective view of a lower portion of a computer housing with a power supply assembly in partially removed position.

Next as illustrated in FIG. 13 a person may grasp the protruding end of the modular power supply assembly 510 and pulls it rearwardly until it is fully removed from the power supply bay 570. As best shown in FIG. 14, the walls of the bay 570 may be provided with a plurality of longitudinally extending tongue portions 571, 573, etc. which are biased to a position slightly inwardly of the interior plane of the corresponding wall. The sizing of the modular power supply and the power supply bay and the friction force exerted by various tongue portions 571, 573, etc. is such that a moderate amount of rearward force must be applied, e.g., 5 lbs. to remove the modular power supply from the bay 570. An interior view of the power supply assembly 510 in a partially removed position is shown in FIG. 9. The power supply completely removed from the bay is illustrated in FIG. 14.

The time which it takes to move the power supply from the seated position shown in FIGS. 3 and 11 to the fully removed position in FIG. 14 is about 5 to 10 seconds. If a screw must be removed from the cam lever the total time required to remove the power supply by an average person with no technical experience who has recently performed the same operation at least once before, is approximately 20 to 30 seconds. Accordingly, the power supply assembly 510 is a "modular" component within the definition of "modular" provided above.

In order to return the modular power supply 510 to its operating position, cam lever 538 is returned to the position of FIGS. 3 and 11 with detent stud 548 received in detent hole 546. Thereafter, the modular 510 is inserted in bay access opening 572 and is pushed forwardly until reaching the seated position shown in FIGS. 3 and 11. In this seated position the high density power connector 526 is electrically connected with socket 580 and AC interlock 528 is engaged with AC interrupt actuator stud 590 causing electrical connection between the power supply and a power source connected thereto through a power cord (not shown) received in AC socket 518. If desired a screw (now shown) may be passed through hole 544 and screwed into hole 545 to positively hold the modular power supply assembly 510 in the seated position of FIG. 11.

It will be appreciated from the foregoing that by mounting both the electrical power components 564 and the power supply cooling fan 566 within a unitary power supply housing 512 which is automatically connected by pushing the power supply into a bay 570 and automatically disconnected by hand removal of the power supply from the bay that it is extremely easy for an operator to remove and inspect the power supply and/or replace a defective power supply with a new power supply if necessary. There are no computer components other than the power supply assembly itself which must be removed or disassembled in any way in order to remove the power supply assembly. Assuming that a person wishes to examine the power supply electrical components 564 or fan 566 it is necessary only to remove a pair of screws 531, etc. from the top face (which are received in bores 535, 537) and a pair of screws 539 from the rear face 524. In the illustrated embodiment the power supply top face 532, rear face 524, and lateral side faces 552, 554 are formed from a unitary piece of sheet metal which has been appropriately formed into the configuration illustrated in FIG. 16. The time it takes to remove the four screws to obtain access to the power supply components inside the power supply housing 512 is about 2 minutes or less. The housing 512 could, of course, be configured in any number of ways, as a routine matter in the sheet metal forming arts, including providing six separate faces having mating or screwably attachable mounting flanges, or providing compound assemblies having two or more faces which are constructed and arranged to be attached to corresponding portions of adjacent faces in order to provide a parallelepiped shaped housing 512. Even if the power supply housing 512 were not easily disassembled to access the internal components, there would still be a great advantage in having a power supply assembly which is easily removed and replaced. A computer user may thus easily return only the power assembly 512 rather than the entire computer for warranty or repair work. In this arrangement, the computer owner does not have to worry about third parties gaining unauthorized access to information on his/her drives and is not faced with the time and expense associated with packaging and shipping of the entire computer. Also, in the event that the entire computer 10 is returned to a warranty repair shop, a defective power supply assembly 510 may be quickly and easily replaced, possibly while the user waits, at a considerable labor cost savings to the warranty shop and/or to the user in the event of a non-warranty repair.

An advantage of the configuration of the modular power supply assembly 510 and the location of power supply bay 570 directly below motherboard bay 300 is that very effective cooling of both the power supply electrical components 564 and the motherboard assembly 350 is achieved by the air flow 592, FIG. 7, provided by the power supply fan 566 which may be, e.g., an axial flow fan such as Model No. AD0812MS sold by Adda of Taiwan and the CPU fan 376 which may be a radial flow air fan such as Model No. 50DC12V manufactured by Global Win of Taiwan. The flow path 592, as best illustrated in FIG. 7, is into the rear face 514 of the power supply housing 512, out the top face 532 of the power supply housing into motherboard bay 300 at a rear portion thereof, through the motherboard bay and out the vent holes 152, 154, etc. in top face 32 of the computer housing 12. (Alternatively, the fan direction may be reversed and the flow path may be through the vent holes 152, 154, etc. in the top side 32 of housing 12, through the motherboard bay 300, into the power supply housing through holes 534 in the top face 532, through the power supply fan and power supply housing and out the vent holes 516, 517, etc. in the rear face 514 of the power supply housing 512.) The air flow generated by either fan produces this general flow path and with both fans operating the airflow rate is of course increased. The operation of each of the fans may be conventionally controlled by a thermostat such that fan operation is provided only when the heat in the associated enclosure reaches a predetermined temperature.

Hard Drive Assembly

Figure 20:
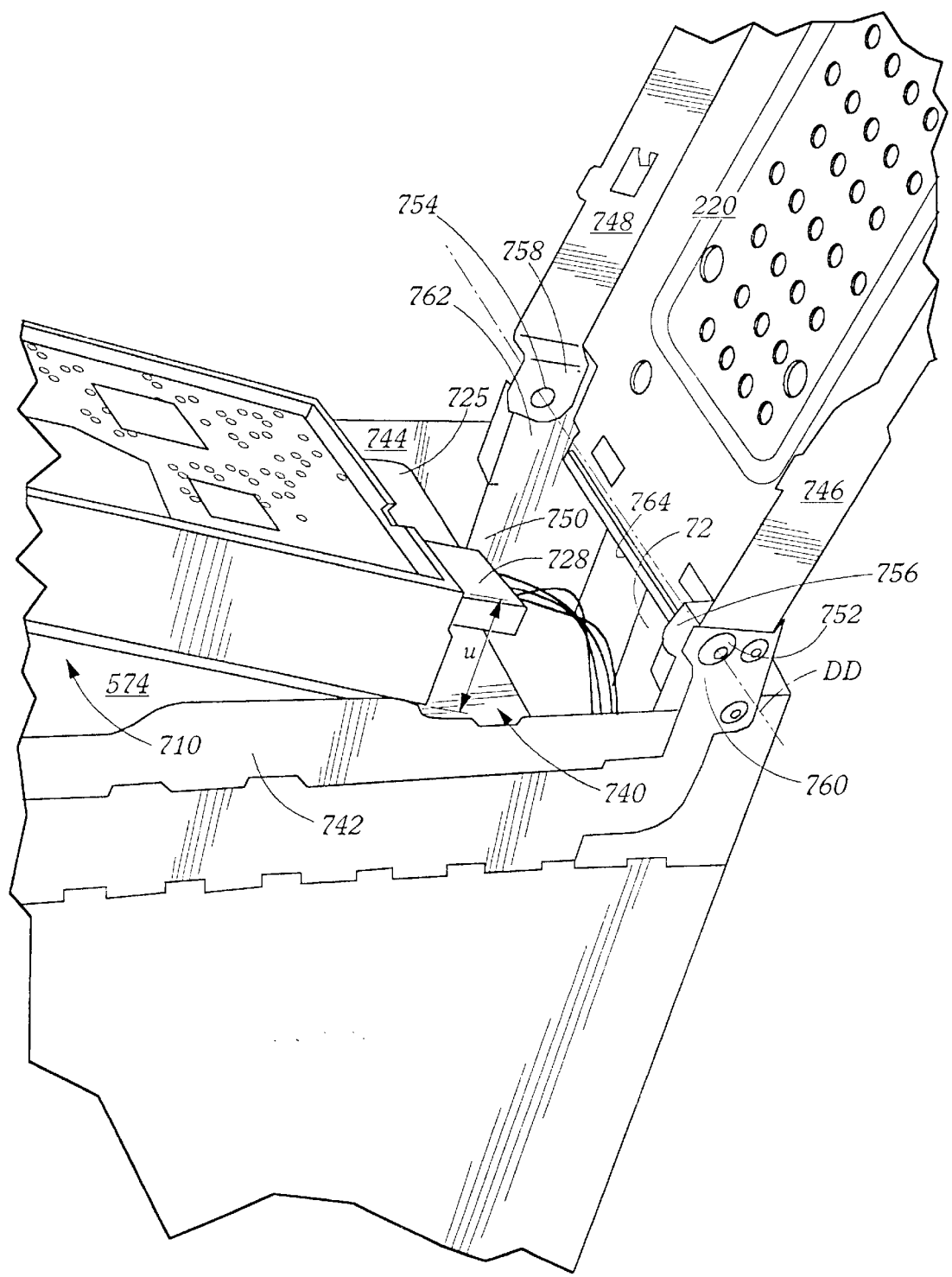
FIG. 20 is a bottom, right perspective view of a lower front portion of a computer housing with a hard drive bay door in an open position and with a hard drive assembly removed.
Figure 21:
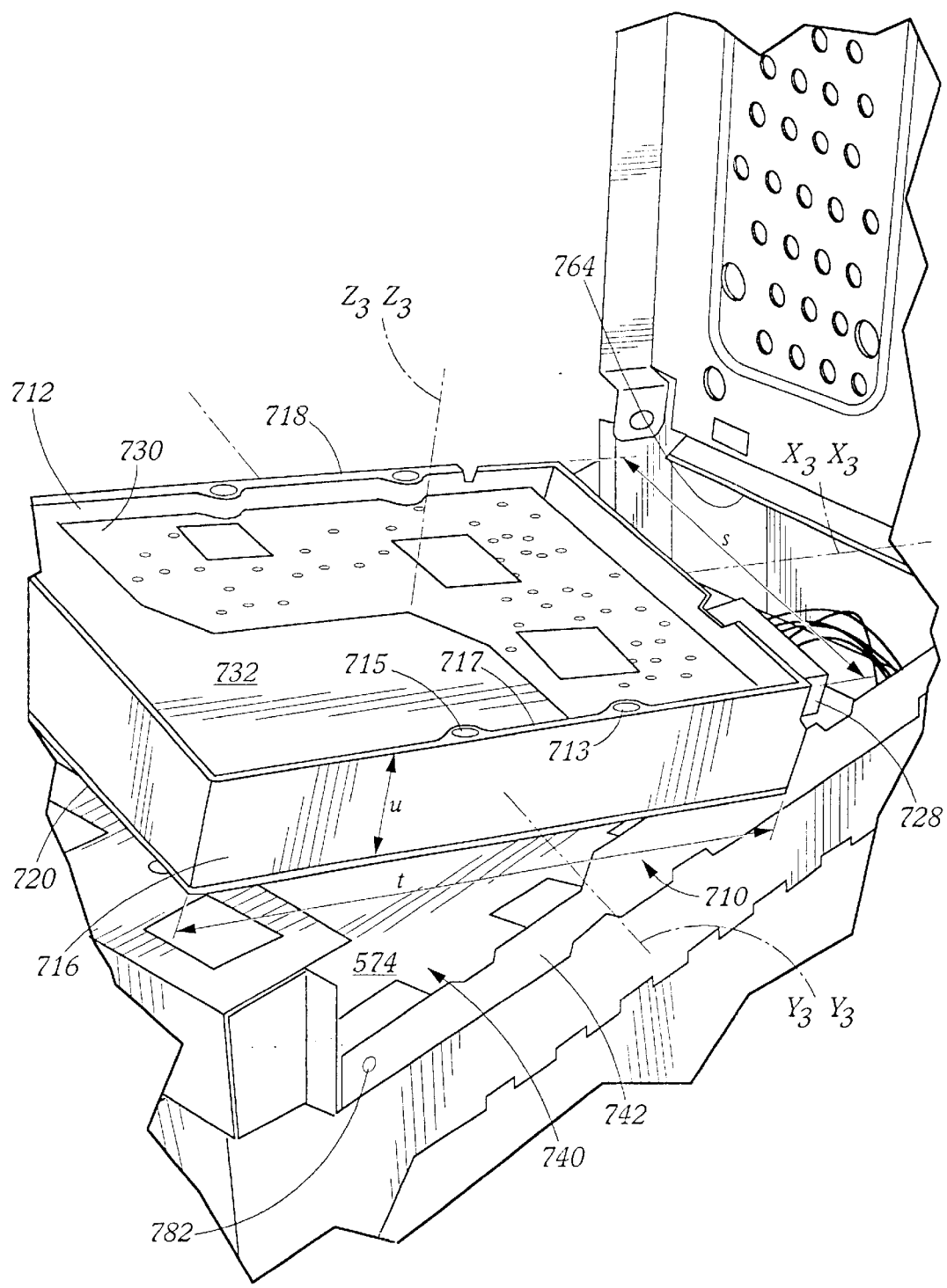
FIG. 21 is a bottom right perspective view of a lower front portion of a computer housing with a hard drive bay door in an open position and with a hard drive removed therefrom but still connected to electrical cables.
Figure 22:
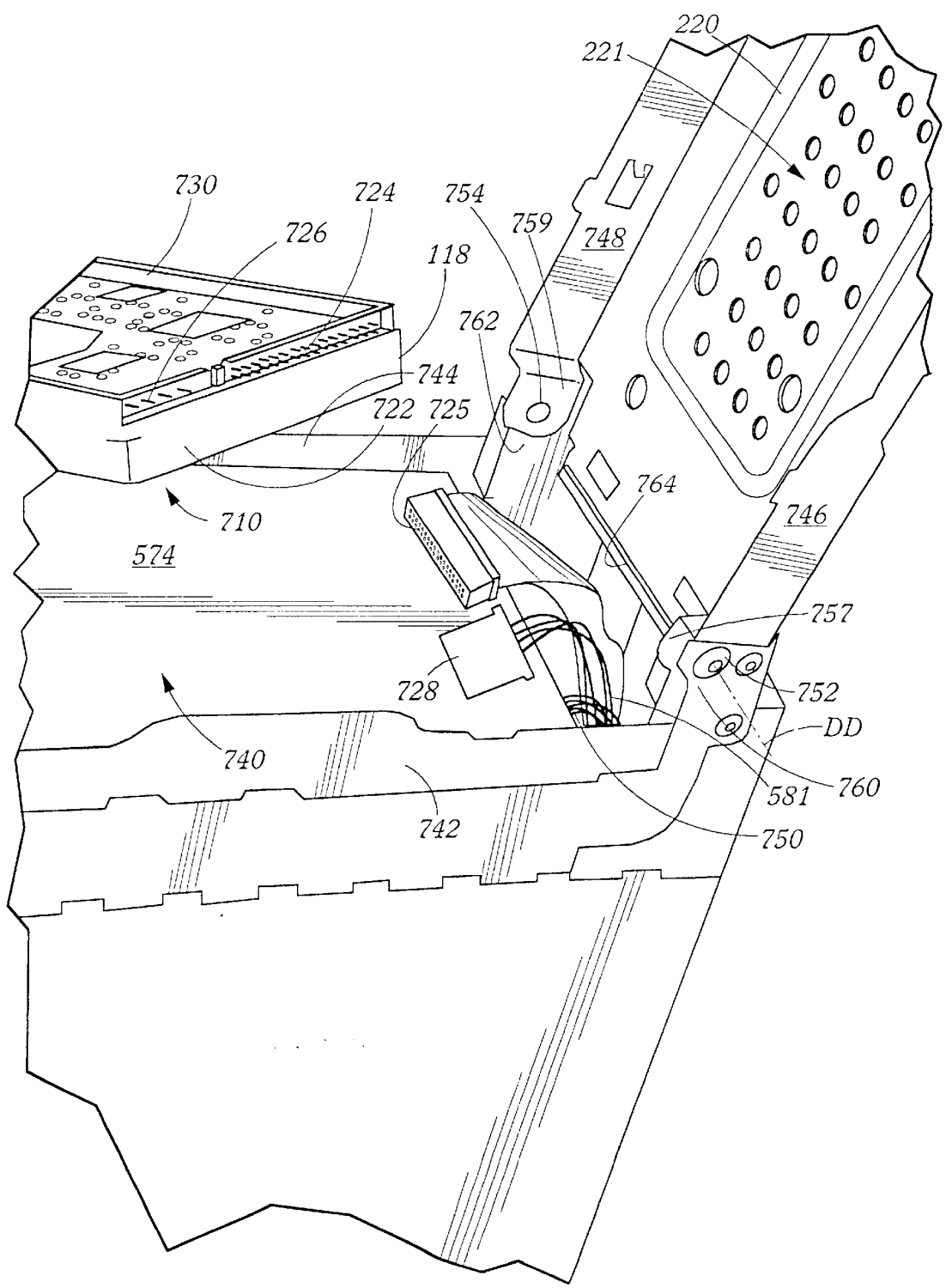
FIG. 22 is a bottom right perspective view of a lower front portion of a computer housing with a hard drive bay door in an open position and with a hard drive removed and completely disconnected from electrical cables.

A hard drive assembly 710 is mounted in a bottom hard drive bay 740 of computer housing 12. The bottom bay has a wall portion 220 which may be pivotally displaced about an axis DD to provide access to the hard drive as illustrated in FIGS. 5 and 18–22. As best shown in FIG. 21 the hard drive assembly 710 includes an open, generally rectangular top face portion 712 having threaded bores 713, 715 provided at one lateral edge 717 thereof. The drive assembly 710 has a generally rectangular bottom face 714, FIG. 18; a generally rectangular first lateral side face 716; a generally rectangular second lateral side face 718; a generally rectangular rear face 720 and a generally rectangular front face 722, FIGS. 21 and 22. The hard drive may have central intersecting longitudinal, lateral, and vertical axes $X_3X_3$, $Y_3Y_3$, and $Z_3Z_3$. The hard drive assembly may have a longitudinally extending length "s" of 100 mm, a laterally extending width "t" of 145 mm and a vertical height "u" of 21 mm, FIG. 21. As best illustrated in FIGS. 20–22, front face 722 has a signal cable connector socket 724 adapted to receive hand connectable signal cable 725 and power cable connector socket 726 adapted to receive hand connectable power cable 728. The sockets 724 and 726 are electrically connected to components mounted on a drive circuit board 730 and encased hard drive 732 which are each mounted within the enclosure defined by the faces 714, 716, 718, 720 and 722.

Figure 18:
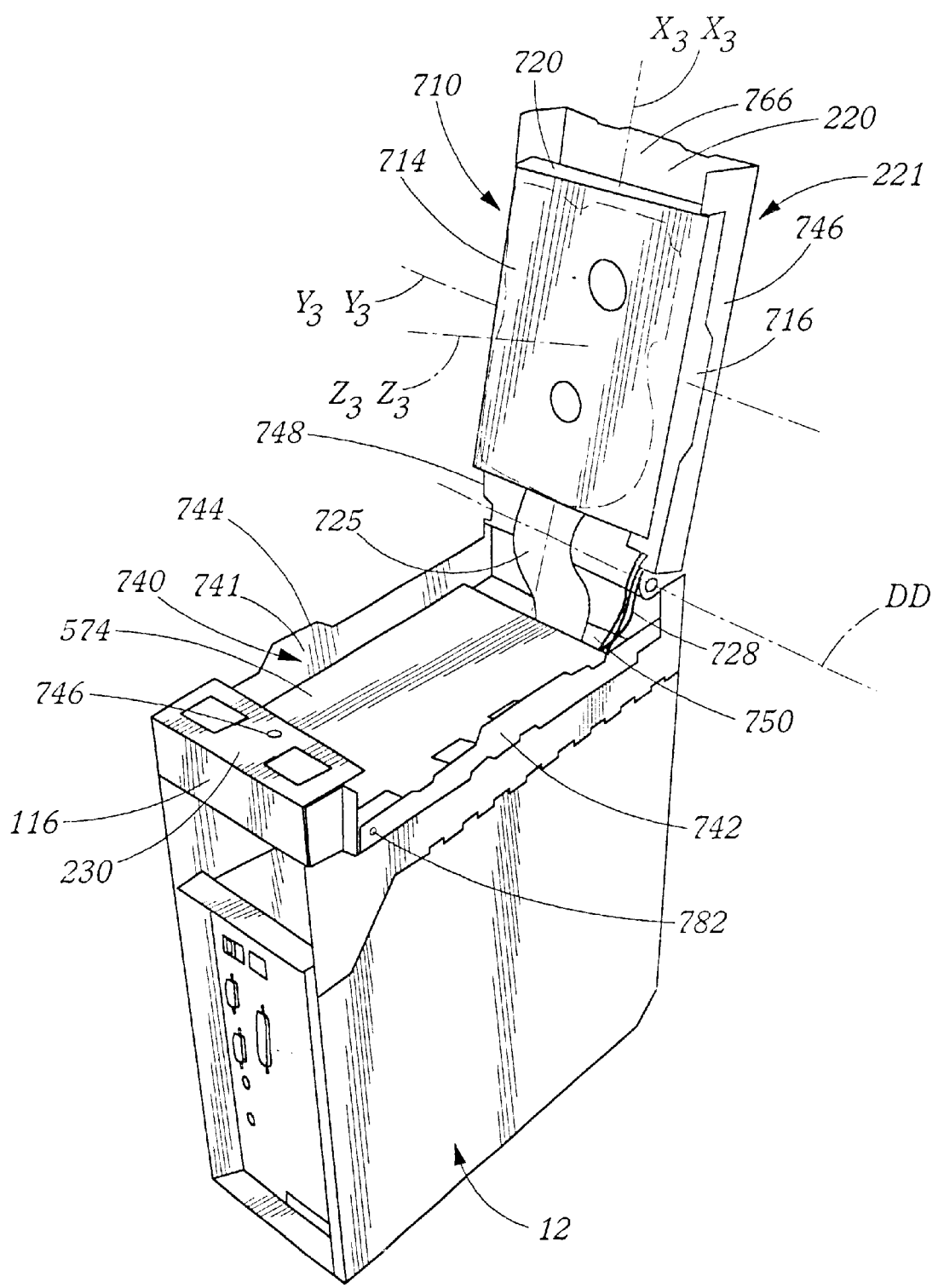
FIG. 18 is a bottom, right, rear perspective view of a computer housing having a hard drive bay door in an open position with a hard drive mounted in the door and with a power supply assembly removed.
Figure 19:
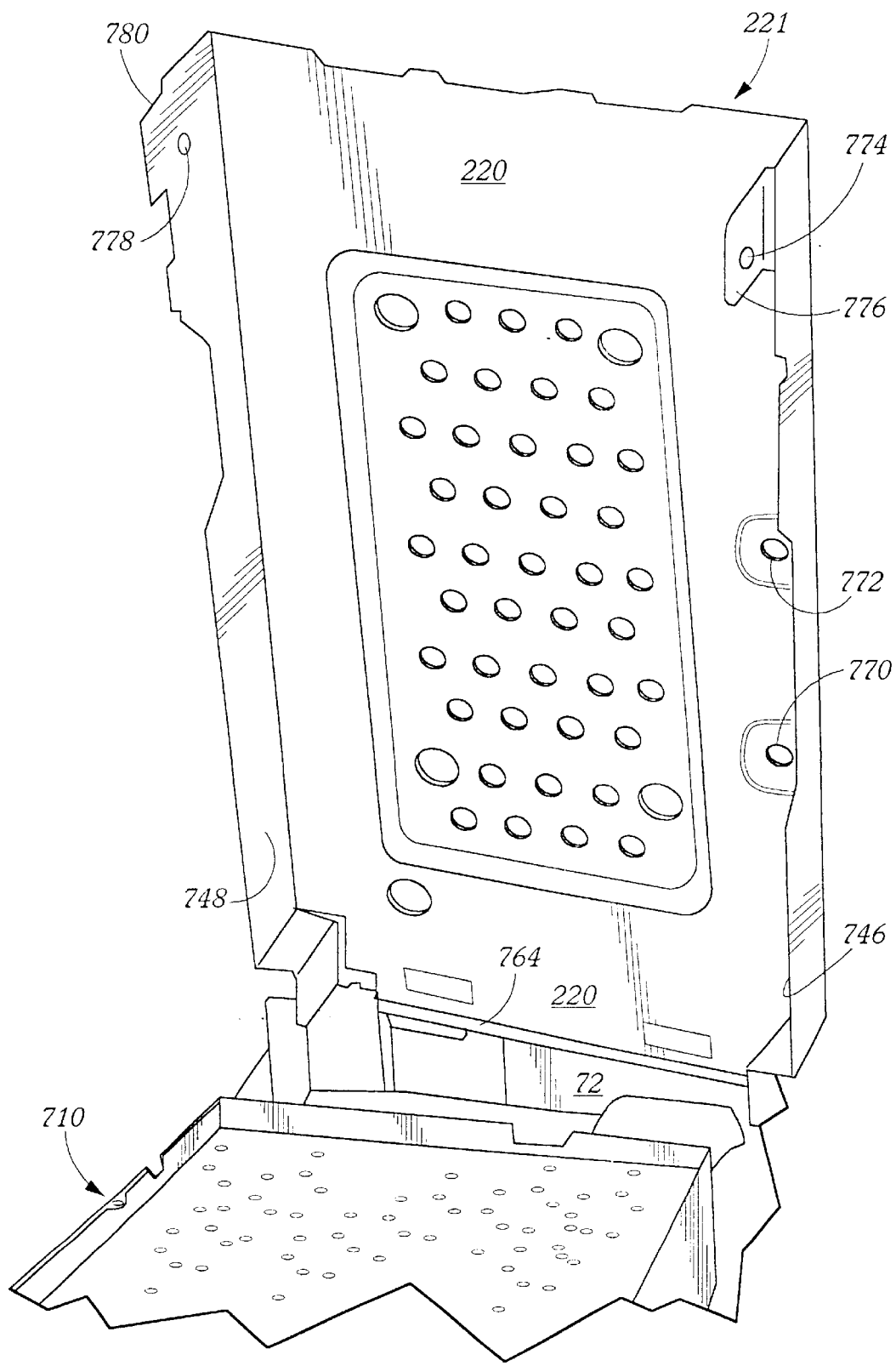
FIG. 19 is a detail rear perspective view of a hard drive bay door in an open position and with a hard drive assembly removed therefrom.

The hard drive bay 740 is provided in a bottom portion of the computer housing 12 and has a normally closed position, FIG. 5, and an open position, FIG. 18. The hard drive bay is defined by top wall 574 and bottom wall 220 which are positioned in parallel relationship when the hard drive bay is in the closed position. The bay is further defined by front wall recess portion 72, FIGS. 1 and 22; left side wall flange 742; right side wall flange 744; bottom wall left vertical flange 746 and bottom wall left vertical flange 748.

As further shown by FIG. 22, there is a front end vertical opening 750 formed by the termination of top wall 574 short of front wall portion 72, e.g., terminating approximately 70 mm short of wall 72, which provides access from the hard drive bay 740 to the forward chamber 581, enabling the signal and power cables 725, 728 to be extended through chamber 581 into the hard drive bay 740.

As best shown in FIGS. 20 and 22, a pair of pins 752, 754 extend through housing flange portions 760 and 762 and through recessed portions 757, 759 of bottom wall flanges 746, 748, respectively. Pins 752, 754 pivotally mount a bottom wall bay access door 221 about axis DD.

The bottom bay door 221 is comprised of bottom wall panel portion 220 and flanges 746, 748, etc. A bottom wall front edge portion 764 extends forward of the pivot axis and into an engaging relationship with bottom wall flange portion 73 when door 220 is closed, FIG. 5. A bore 766 in door 220 is adapted to receive a screw 238 therethrough which may in turn be threaded into bore 768 in the housing fixed bottom wall portion 230 to positively secure the pivotally displaceable bottom wall door 221 to fixed bottom wall portion 230. The hard drive assembly 710 is removably affixed to the pivotal door 220 as by screws 244, 246, FIG. 5 received through bores 770, 772, FIG. 19, in the door 221 which are in turn threaded through bores 713, 715 in the hard drive assembly, FIG. 21, so as to mount the hard drive in the door 221 as illustrated in FIG. 18.

In addition the positive retention of door 221 in a closed position by screw 238, further devices for holding the door in the closed position may be provided, for example, a detent boss 774 may be provided in flange 776 and a detent boss 778 may be provided in flange 780. The detent bosses co-act with bore holes 782 (only one shown) in flanges 742 and 744 respectively.

FIG. 5 illustrates door 220 in its closed position with hard drive assembly 710 mounted in an operating position within hard drive bay 740. In order to access the hard drive, initially door retaining screw 238 is removed with a conventional screw driver 239. Next the door 220 is swung open about pivot access DD to the position shown in FIG. 18. Next, screws 244, 246 are removed enabling the hard drive assembly 710 to be removed from door 220 and supported on surface 574, FIGS. 19 and 20. Next, as illustrated in FIG. 21 the signal cable 725 and power cable 728 are hand removed from the corresponding sockets 724, 726. The hard drive may now be completely removed from the computer 10, FIG. 22. It is to be understood that the removal may also be performed in an altered sequence. For example the screws 244, 246 might be removed before screw 238, or the cables might be taken off before removing screws 244, 246. The total time required to remove the hard drive assembly 710 from the computer 10, starting from the operating position shown in FIG. 5, by an average person with no technical experience who has recently performed the same operation at least once before, is less than three minutes. Accordingly, the hard drive assembly 710 is a "modular" component within the definition of "modular" provided above.

A hard drive may be remounted in the computer by performing the above described removal process in reverse. The time that it takes to remount the hard drive is generally comparable to the time that it takes to remove the hard drive, less than three minutes.

It will be appreciated that providing a computer with a modular hard drive assembly 710 such as described above provides many benefits to both a user and to a computer service department. For example, if a user desires to have work performed on a defective hard drive he/she can easily remove it and ship it to a repair site without going through the considerable trouble of packing and shipping the entire computer. Furthermore, the individual may be able to continue using his computer without the hard drive if he has other drives which have a copy of the computer operating system. Another benefit is that a computer operator who requires service to another portion of his computer may remove and retain the hard drive before shipping the computer and thus retain control over the hard drive and possibly sensitive data contained thereon. Also, a user may use the removable hard drive in the same manner that a computer user uses removable media. For example, in a computer which is shared by multiple users, each user might own and retain his or her individual hard drive which he/she manually installs at the beginning of an operating session. A removable hard drive is, of course, a great benefit to a repair shop which may easily replace a defective hard drive for the user, possibly while the user waits. The easily removable hard drive reduces labor time associated with hard drive repair or warranty service and thus is beneficial to the computer servicer as well as the computer user.

Thus it will be seen that a computer 10 may be provided which is very compact and occupies a relatively small "footprint" on a desk top. For example, the embodiment of the housing specifically described above has a total volume of less than 7143 $cm^3$. However the manner in which components are mounted in the computer allows easy access to the various components of the computer, even in this relatively compact configuration. The removable media drive, hard drive, and power supply are each modular components allowing easy removal and replacement/repair/inspection of these components. This modular construction also enables the computer motherboard assembly to be readily-accessible for maintenance and repair or upgrading.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A tower computer comprising:
   a sheet metal housing comprising a plurality of separate bays housing a plurality of computer components, said separate bays comprising a bay located at one vertical end of said sheet metal housing, said housing end bay comprising a bottom bay;
   a media drive assembly readily-removeably-mounted in said end bay exclusive of any other ones of said plurality of computer components.

2. The computer of claim 1, said sheet metal housing comprising an end sheet metal wall defining a portion of said end bay.

3. The computer of claim 2, said end wall being pivotally mounted on said housing about an end wall pivot axis.

4. The computer of claim 3, said end bay being accessible thorough pivotal displacement of said end wall.

5. The computer of claim 4, said housing having a normal operating orientation, said end wall being pivotal about a horizontally disposed pivot axis when said housing is in said normal operating orientation.

6. The computer of claim 4, said media drive assembly being removeably attached to said end sheet metal wall and pivotally displaceable therewith.

7. The computer of claim 5, said media drive assembly being removeably attached to said end sheet metal wall and pivotally displaceable therewith, said media drive assembly having at least one cable connected to a portion thereof positioned proximate said end wall pivot axis.

8. The computer of claim 6 wherein:
   said housing being a generally parallelepiped shaped, sheet metal housing comprising:
   central, intersecting longitudinal, lateral and vertical housing axes;
   opposed, generally longitudinally and laterally extending, housing top and bottom walls;
   opposed, generally vertically and laterally extending, housing front and rear walls;
   opposed, generally vertically and longitudinally extending, housing side walls, said housing side walls extending longitudinally a greater distance than said housing front and back walls extending laterally;
   said media drive assembly being a generally parallelepiped shaped, media drive assembly comprising:
   central, intersecting longitudinal, lateral and vertical drive axes;
   opposed, generally longitudinally and laterally extending, drive top and bottom walls;
   opposed, generally vertically and laterally extending, drive front and rear walls;
   opposed, generally vertically and longitudinally extending, drive side walls, said drive side walls extending vertically substantially less than said drive bottom wall extends laterally or longitudinally;

said housing pivotal end wall having a normally closed, operating position and an open, bay accessing position, said drive assembly being mounted on said housing end wall with said central, intersecting longitudinal, lateral and vertical drive axes positioned in parallel relationship with said central, intersecting longitudinal, lateral and vertical housing axes when said housing end wall is in said normal operating position.

9. The computer of claim 8, said housing end wall having vent holes therein.

10. The computer of claim 8, said housing end wall comprising a holding device at an end thereof positioned remotely from said pivot axis for releasably holding said end wall in said normally closed position.

11. The computer of claim 8, said housing end wall comprising a bottom wall.

12. A method of making a tower computer comprising:

providing a housing with an enclosure at a bottom end;

pivotally mounting an end panel at said bottom end in pivotally coverable and uncoverable relationship with said enclosure;

readily-removeably mounting a first media drive in said enclosure;

mounting a computer motherboard assembly, a computer power supply and all media drives other than said first media drive in a portion of said housing outside said enclosure.

13. The method of claim 12 wherein readily-removeably mounting a first media drive in said enclosure comprises removeably attaching said first media drive to said pivotal end panel.

14. The method of claim 13 wherein removeably attaching said first media drive to said pivotal end panel comprises positioning a relatively larger face portion of said media drive in abutting relationship with said end panel and positioning an end of said drive having a power cable attached thereto proximate a pivotally attached end of said end panel.

15. A method of removing a media drive from a tower computer having a plurality of computer functional components contained within a housing comprising:

opening a bottom access door to a computer housing enclosure which encloses, out of said plurality of computer functional components, only a media drive;

disconnecting electrical cables from said media drive.

16. The method of claim 15 further comprising detaching said media drive from said access door.

17. The method of claim 16 wherein said opening an access door to a computer housing enclosure comprises pivotally displacing said access door.

* * * * *